(12) United States Patent
Kneckt et al.

(10) Patent No.: US 12,671,982 B2
(45) Date of Patent: Jun. 30, 2026

(54) RECONFIGURED TRIGGER-FRAME RESPONSE

(71) Applicant: Apple Inc., Cupertino, CA (US)

(72) Inventors: Jarkko L. Kneckt, Los Gatos, CA (US); Yong Liu, Campbell, CA (US); Su Khiong Yong, Palo Alto, CA (US); Leonid Epstein, Netanya (IL); Zhou Lan, San Jose, CA (US); Anuj Batra, Redwood City, CA (US); Mohamed Abouelseoud, Burlingame, CA (US); Qi Wang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 324 days.

(21) Appl. No.: 18/447,478

(22) Filed: Aug. 10, 2023

(65) Prior Publication Data

US 2024/0080660 A1 Mar. 7, 2024

Related U.S. Application Data

(60) Provisional application No. 63/401,498, filed on Aug. 26, 2022.

(51) Int. Cl.
*H04W 8/24* (2009.01)
*H04W 24/02* (2009.01)
*H04W 84/12* (2009.01)

(52) U.S. Cl.
CPC .............. *H04W 8/24* (2013.01); *H04W 24/02* (2013.01); *H04W 84/12* (2013.01)

(58) Field of Classification Search
CPC ....... H04W 8/24; H04W 24/02; H04W 84/12; H04W 74/06
See application file for complete search history.

(56) References Cited

U.S. PATENT DOCUMENTS

| 9,967,877 | B2 | 5/2018 | Seok |
| 2020/0213870 | A1 | 7/2020 | Wang |

(Continued)

FOREIGN PATENT DOCUMENTS

| EP | 4290972 A1 | * 12/2023 | ............ H04L 69/14 |
| WO | 2022169309 | 8/2022 | |

OTHER PUBLICATIONS

Extended European Search Report for EP Patent Application No. EP23193508.1; Dec. 11, 2023.
"TGbe_C1_09"; IEEE P802.11be/D0.3; Jan. 2021.

*Primary Examiner* — Mohammad S Anwar
(74) *Attorney, Agent, or Firm* — Kowert, Hood, Munyon, Rankin & Goetzel, P.C.

(57) ABSTRACT

An electronic device (such as an access point) that receives a modified response frame is described. During operation, an interface circuit in the electronic device may provide a trigger frame addressed to a second electronic device, where the trigger frame includes a trigger-frame variant that is compatible with an IEEE 802.11 standard (such as IEEE 802.11ax or a subsequent IEEE 802.11 standard). Then, the interface circuit may receive a modified response frame associated with the second electronic device, where the modified response frame is different from a response frame associated with the trigger frame specified by the IEEE 802.11 standard. When the second electronic device indicates support for the modified response frame during association with the electronic device, the interface circuit may define parameters associated with the modified response frame in an association response.

18 Claims, 24 Drawing Sheets

(56)          References Cited

U.S. PATENT DOCUMENTS

| | | | |
|---|---|---|---|
| 2021/0028833 A1 | 1/2021 | Seok | |
| 2021/0227529 A1* | 7/2021 | Chu | H04W 72/23 |
| 2025/0234275 A1* | 7/2025 | Kim | H04W 48/14 |

* cited by examiner

OCTETS          1                    1                    j                VARIABLE

| ELEMENT IDENTIFIER | LENGTH | ORGANIZATION IDENTIFIER | VENDOR-SPECIFIC CONTENT |
|---|---|---|---|

OCTETS          1                    1              VARIABLE          VARIABLE

| CATEGORY | PUBLIC ACTION | ORGANIZATION IDENTIFIER | VENDOR-SPECIFIC CONTENT |
|---|---|---|---|

OCTETS    2     2     6     6    8 OR MORE   VARIABLE   VARIABLE    4

| FRAME CONTROL | DURATION | RECIPIENT ADDRESS | TRANSMIT ADDRESS | COMMON INFO. | USER-INFO. LIST | PADDING | FCS |

| B0 | B3 | B4 | B5 | B6 | B7 | B8 | B9 | B10 | B17 | B18 | B25 |
|----|----|----|----|----|----|----|----|-----|-----|-----|-----|

| ACI BITMAP | DELTA TID | ACI HIGH | SCALING FACTOR | QUEUE SIZE HIGH | QUEUE SIZE ALL |
|------------|-----------|----------|----------------|-----------------|----------------|

BITS      4          2          2          2          8          8

| CATEGORY | PUBLIC ACTION | ORGANIZATION IDENTIFIER | EXTENDED BSR AND TRIGGER INFO. |
|----------|---------------|-------------------------|--------------------------------|

OCTETS      1          1          VARIABLE          8 + j

| ELEMENT | LENGTH | ORGANIZATION IDENTIFIER | BSR | UPLINK FRAME ARRIVAL | TRIGGER INFO. |
|---------|--------|-------------------------|-----|----------------------|---------------|
| 1 | 1 | VARIABLE | 4 | 1 | 1 |

OCTETS

FIG. 24

| SUPPORT OF VENDOR-SPECIFIC TRIGGER FRAME | SUPPORT OF UNKNOWN VENDOR-SPECIFIC TRIGGER FRAME | SUPPORT OF VENDOR-SPECIFIC SOLICT FRAME | SUPPORT OF CONFIGURABLE RESPONSE TO TRIGGER | RESERVED |
|---|---|---|---|---|
| 1 | 1 | 1 | 1 | 4 |

BITS

FIG. 27

RECONFIGURED TRIGGER-FRAME RESPONSE

CROSS-REFERENCE TO RELATED APPLICATION

This application claims the benefit of U.S. Provisional Application No. 63/401,498, entitled "Reconfigured Trigger Frame Response," by Jarkko L. Kneckt, et al., filed Aug. 26, 2022, the contents of which are hereby incorporated by reference.

FIELD

The described embodiments relate, generally, to wireless communications among electronic devices, including communication techniques for repurposing a trigger-frame response.

BACKGROUND

Many electronic devices communicate with each other using wireless local area networks (WLANs), such as those based on a communication protocol that is compatible with an Institute of Electrical and Electronics Engineers (IEEE) standard, such as an IEEE 802.11 standard (which is sometimes referred to as 'Wi-Fi'). Existing IEEE 802.11 standards define multiple predefined types of trigger frames, or trigger frame variants, which are specified by a trigger type subfield value. In addition, a vendor-specific trigger frame has been proposed in IEEE 802.11me. While this proposed vendor-specific trigger frame allows an access point to request information to be transmitted in allocated resource units (RUs), it requires hardware support in the recipient stations, which is often expensive and time consuming to implement, and typically results in long adoption delays.

SUMMARY

An electronic device that receives a modified response frame is described. This electronic device includes: an antenna node that can communicatively couple to an antenna; and interface circuitry that can communicatively couple to the antenna node, and that can communicate with a second electronic device. During operation, the interface circuit provides a trigger frame addressed to the second electronic device, where the trigger frame includes a trigger-frame variant that is compatible with an IEEE 802.11 standard. Then, the interface circuit receives a modified response frame associated with the second electronic device, where the modified response frame is different from a response frame associated with the trigger frame specified by the IEEE 802.11 standard.

Moreover, the interface circuit may provide another frame after the trigger frame is provided and before the modified response frame is received. This other frame may be different from the trigger frame, and the other frame may be addressed to the second electronic device or a third electronic device.

Furthermore, the trigger frame may include a trigger type subfield value of 15 or a value between 0 and 7.

Additionally, the electronic device may include an access point.

Note that the IEEE 802.11 standard may include IEEE 802.11ax or a subsequent IEEE 802.11 standard.

In some embodiments, the interface circuit may provide a beacon advertising support for the modified response frame.

Moreover, the interface circuit may: receive an association request associated with the second electronic device, where the association request includes an indication of support by the second electronic device for the modified response frame and a request for parameters associated with the modified response frame; and provide an association response addressed to the second electronic device, where the association response includes an indication of support by the electronic device for the modified response frame and the parameters associated with the modified response frame. For example, the parameters may specify a minimum response time and a maximum response time for the modified response frame. Alternatively or additionally, the parameters may specify data to include in the modified response frame.

Furthermore, the modified response frame may include a modified payload that is different from a payload associated with the trigger frame specified by the IEEE 802.11 standard.

Additionally, the modified response frame may selectively include a variable amount of padding.

Other embodiments provide the second electronic device that performs counterpart operations corresponding to at least some of the aforementioned operations performed by the electronic device. Notably, a second interface circuit in the second electronic device receives a trigger frame associated with the electronic device, where the trigger frame includes a trigger-frame variant that is compatible with an IEEE 802.11 standard. Then, the second interface circuit provides a modified response frame addressed to the electronic device, where the modified response frame is different from a response frame associated with the trigger frame specified by the IEEE 802.11 standard.

Moreover, the second interface circuit may receive another frame associated with the electronic device after the trigger frame is received and before the modified response frame is provided, where the other frame is different from the trigger frame.

Furthermore, the second interface circuit may receive a beacon associated with the electronic device advertising support for the modified response frame.

Additionally, the second interface circuit may: provide an association request addressed to the electronic device, where the association request includes an indication of support by the second electronic device for the modified response frame and a request for parameters associated with the modified response frame; and receive an association response associated with the electronic device, where the association response includes an indication of support by the electronic device for the modified response frame and the parameters associated with the modified response frame.

Other embodiments provide an integrated circuit (which is sometimes referred to as a 'communication circuit') for use with the electronic device or the second electronic device. The integrated circuit may perform at least some of the aforementioned operations or counterpart operations corresponding to at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations performed by the electronic device or counterpart operations performed by the second electronic device.

Other embodiments provide a method for receiving or providing a modified response frame. The method includes at least some of the aforementioned operations performed by the electronic device or counterpart operations performed by the second electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, where like reference numerals designate like structural elements.

FIG. 24 is a drawing illustrating an example of an extended buffer status report and triggering information element.

FIG. 27 is a drawing illustrating an example of a vendor-specific trigger frame.

Note that like reference numerals refer to corresponding parts throughout the drawings. Moreover, multiple instances of the same part are designated by a common prefix separated from an instance number by a dash.

DETAILED DESCRIPTION

Figure 1:
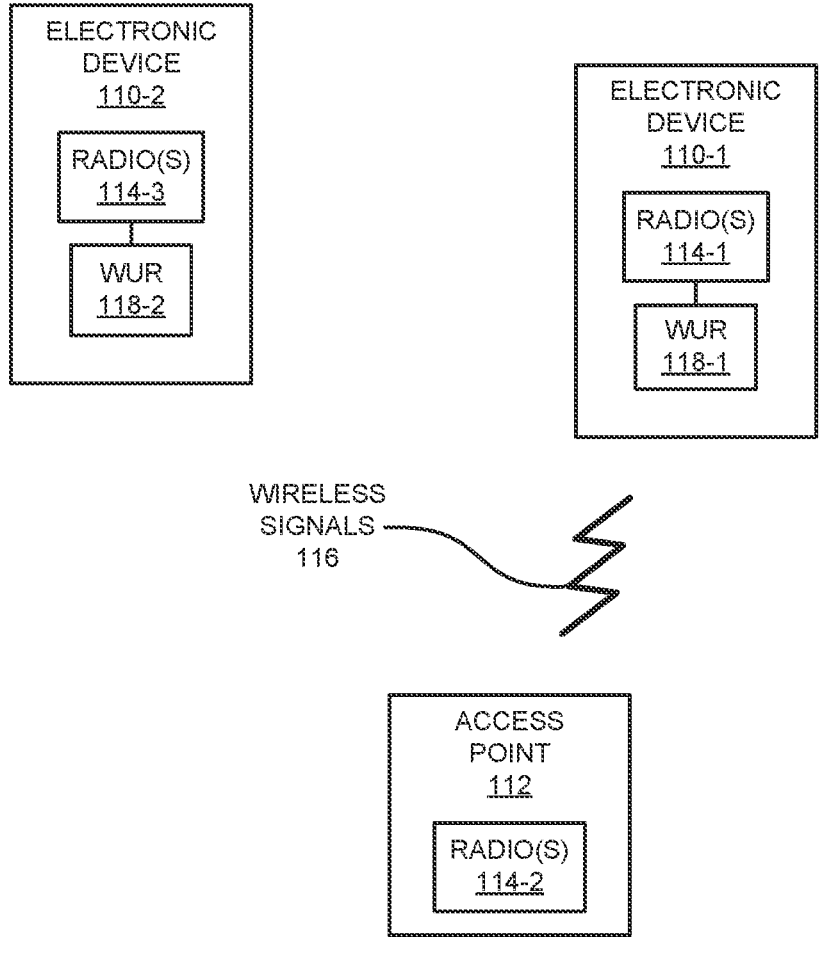
FIG. 1 is a block diagram illustrating an example of communication between electronic devices.

An electronic device (such as an access point) that receives a modified response frame is described. During operation, an interface circuit in the electronic device may provide a trigger frame addressed to a second electronic device, where the trigger frame includes a trigger-frame variant that is compatible with an IEEE 802.11 standard (such as IEEE 802.11ax or a subsequent IEEE 802.11 standard). Then, the interface circuit may receive a modified response frame associated with the second electronic device, where the modified response frame is different from a response frame associated with the trigger frame specified by the IEEE 802.11 standard. When the second electronic device indicates support for the modified response frame during association with the electronic device, the interface circuit may define parameters associated with the modified response frame in an association response, such as: a minimum response time and a maximum response time for the modified response frame; and/or data to include in the modified response frame.

By providing the modified response frame, these communication techniques may facilitate improved communication in a WLAN. For example, the communication techniques may provide additional degrees of freedom for an access point to request specific information from a station. Moreover, the disclosed vendor-specific trigger frames may be implemented using software, as opposed to hardware. This may reduce the cost and complexity of implementing the disclosed vendor-specific trigger frames, and may expand and accelerate adoption of the communication techniques. Consequently, the communication techniques may improve the user experience and customer satisfaction.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11me and/or IEEE 802.11UHR, which are used as illustrative examples in the discussion that follows. However, these communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, California) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, IEEE 802.11me, IEEE 802.11bi, IEEE 802.11bn, IEEE 802.11UHR or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have one or more connections with access point 112. For example, electronic devices 110 and access point 112 may wirelessly communicate while: detecting one another by scanning wireless channels, transmitting and receiving beacons or (equivalently) beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'clients,' 'stations,' or 'recipient electronic devices.'

Figure 28:
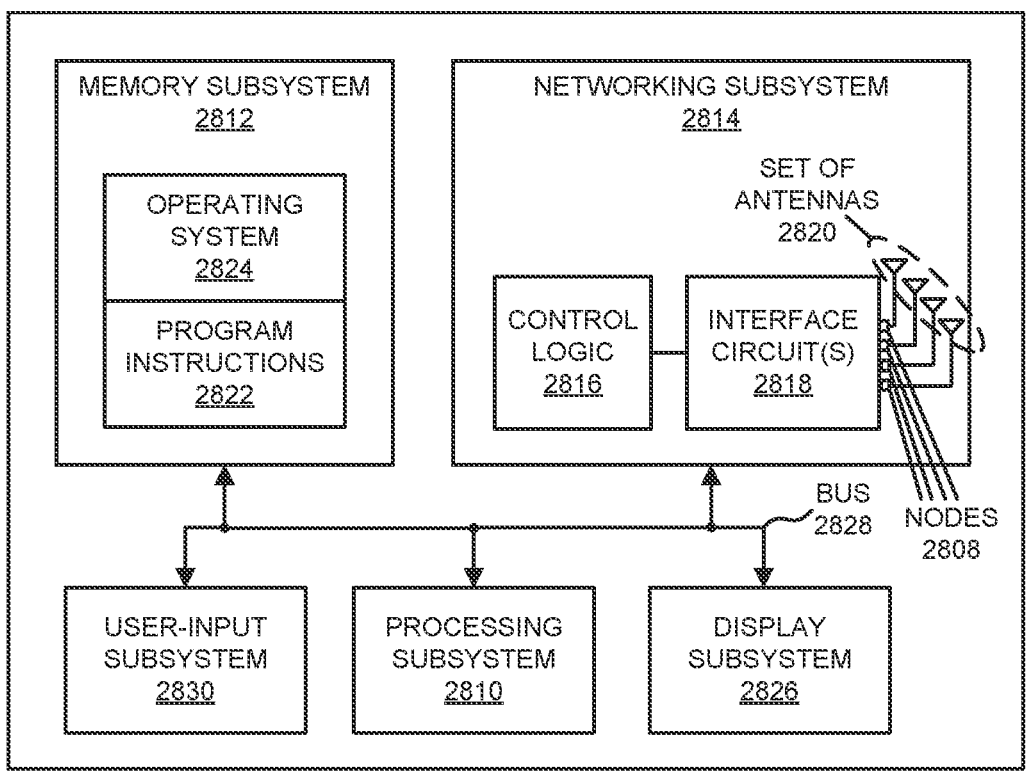
FIG. 28 is a block diagram illustrating an example of an electronic device of FIG. 1 or 2.

As described further below with reference to FIG. 28, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacon frames on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112, respectively. For example, as noted previously, electronic device 110-1 and access point 112 may exchange packets or frames using a Wi-Fi communication protocol in a WLAN. As illustrated further below with reference to FIGS. 2-26, one or more radios 114-1 may receive wireless signals 116 that are transmitted by one or more radios 114-2 via one or more links between electronic device 110-1 and access point 112. Alternatively, the one or more radios 114-1 may transmit wireless signals 116 that are received by the one or more radios 114-2.

In some embodiments, wireless signals 116 are communicated by one or more radios 114 in electronic devices 110 and access point 112, respectively. For example, one or more radios 114-1 and 114-3 may receive wireless signals 116 that are transmitted by one or more radios 114-2 via one or more links between electronic devices 110-1 and 110-2, and access point 112.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

Figure 2:
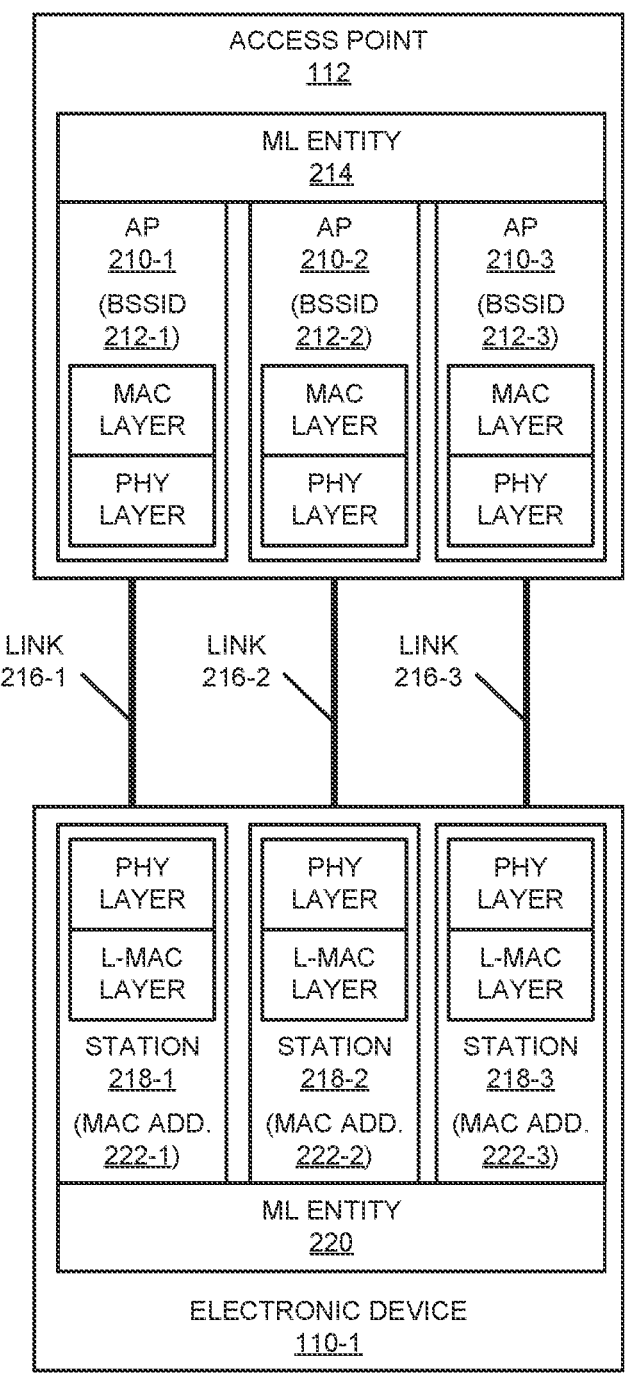
FIG. 2 is a block diagram illustrating an example of communication between electronic devices.

IEEE 802.11be has proposed the use of multiple concurrent links between electronic devices, such as access point 112 and one or more of electronic device 110. For example, as shown in FIG. 2, which presents a block diagram illustrating an example of electronic devices communicating wirelessly, access point 112 may be an access point MLD that includes multiple access points 210, which are cohosted or collocated in access point 112. In the present discussion, 'cohosted' or 'co-located' means that access points 210 are physically or virtually implemented in the same access point MLD, or are affiliated with the same access point MLD. Note that this meaning of 'cohosted' does not indicate that access points 210 have the same primary 20 MHz channel. Access points 210 may have associated basic service set identifiers (BSSIDs) 212, and media access control (MAC) and physical (PHY) layers (including separate radios, which may be included in the same or different integrated circuits). Note that access point 112 may have an ML entity 214 having an MLD MAC address, an ML identifier, a service set identifier (SSID), and that may provide security for access points 210.

Moreover, access points 210 may have different concurrent links 216 in different bands of frequencies (such as a link 216-1 with a link identifier 1 in a 2.4 GHz band of frequencies, a link 216-2 with a link identifier 2 in a 5 GHz band of frequencies and a link 216-3 with a link identifier 3 in a 6 GHz bands of frequencies) with stations 218 in at least electronic device 110-1, which is a non-access point MLD. These stations may have associated lower MAC and PHY layers (including separate radios, which may be included in the same or different integrated circuits). In addition, electronic device 110-1 may have an ML entity 220 having an MLD MAC address.

For example, the access point MLD may have three radios. One radio may operate on a 2.4 GHz band of frequencies, and the other radios may operate on the 5/6 GHz bands of frequencies. The access point MLD may create three access points 210, operating on a 2.4 GHz channel, a 5 GHz channel, and a 6 GHz channel respectively. The three access points 210 may operate independently, each of which has at least one BSS with different BSSIDs 212. (While FIG. 2 illustrates the access point MLD with three access points 210, more generally the access point MLD may include up to 15 access points with one or more access points in a given band of frequencies.) Moreover, each of the access points 210 may accommodate both legacy non-access point stations as well as non-access point MLD stations 218. Furthermore, each of access points 210 may transmit its own beacon frames using its own BSSID. Additionally, the access point MLD may have ML entity 214, identified by an MLD address (such as an MLD MAC address). This MAC address may be used to pair with ML entity 220 of the associated non-access point MLD stations 218.

Moreover, the non-access point MLD station (e.g., electronic device 110-1) may have two or three radios. One radio may operate on a 2.4 GHz band of frequencies, and the other radios may operate on the 5/6 GHz bands of frequencies. When the non-access point MLD establishes a ML association with the access point MLD, it may create up to three stations 218, each of which associates to one of access points 210 within the access point MLD. Each of stations 218 may have a different over-the-air MAC address 222. The non-access point MLD may also have ML entity 220, identified by another MLD address (such as another MLD MAC address). This MLD MAC address may be used to pair with ML entity 214 of the associated access point MLD.

Referring back to FIG. 1, as noted previously, it can be expensive and complicated to implement existing proposals for vendor-specific trigger frames in hardware. In addition, these approaches often delay and/or reduce adoption or use of vendor-specific trigger frames.

In order to address these problems, as described further below with reference to FIGS. 3-26, in the communication techniques access point 112 and electronic device 110-1 may define or specify parameters for a vendor-specific trigger frame during the association process. For example, electronic device 110-1 may provide (and access point 112 may receive) an association request. This association request may include an indication of support by electronic device 110-1 for the modified response frame and a request for parameters associated with the modified response frame. In response, access point 112 may provide (and electronic device 110-1 may receive) an association addressed to electronic device 110-1. This association response may include an indication of support by access point 112 for the modified response frame and the parameters associated with the modified response frame. For example, the parameters may specify a minimum response time and a maximum response time for the modified response frame. Alternatively or additionally, the parameters may specify data to include in the modified response frame.

Subsequently, access point 112 may provide a trigger frame addressed to electronic device 110-1. For example, the trigger frame may include a trigger type subfield value of 15 or a value between 0 and 7. This trigger frame may include a trigger-frame variant that is compatible with an IEEE 802.11 standard, such as IEEE 802.11ax or a subsequent IEEE 802.11 standard. In response, electronic device 110-1 may provide the modified response frame addressed to access point 112. The modified response frame may be different from a response frame associated with the trigger frame specified by the IEEE 802.11 standard. For example, the modified response frame may include a modified payload that is different from a payload associated with the trigger frame specified by the IEEE 802.11 standard and/or a variable amount of padding. Moreover, access point 112 may receive the modified response frame from electronic device 110-1.

In summary, the disclosed communication techniques define embodiments of vendor-specific trigger frames. These communication techniques may provide additional degrees of freedom for an access point to request specific information from a station. Moreover, the disclosed vendor-specific trigger frames may be implemented using software, as opposed to hardware. This may reduce the cost and complexity of implementing the disclosed vendor-specific trigger frames, and may expand and accelerate adoption of the communication techniques. Consequently, the communication techniques may improve the user experience and customer satisfaction.

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as Orthogonal Frequency Division Multiple Access or OFDMA). For example, the one or more radios 114-2 may provide one or more trigger frames for the one or more electronic devices. Moreover, in response to receiving the one or more trigger frames, the one or more radios 114-1 may provide one or more group or block acknowledgments to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a predetermined or predefined time interval (such as a time interval between, e.g., 1 and 10 s) to an estimated maximum number of bytes that can be communicated in the predetermined or predefined time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between electronic devices 110. Consequently, one of electronic devices 110 may perform operations in the communication techniques.

Figure 3:
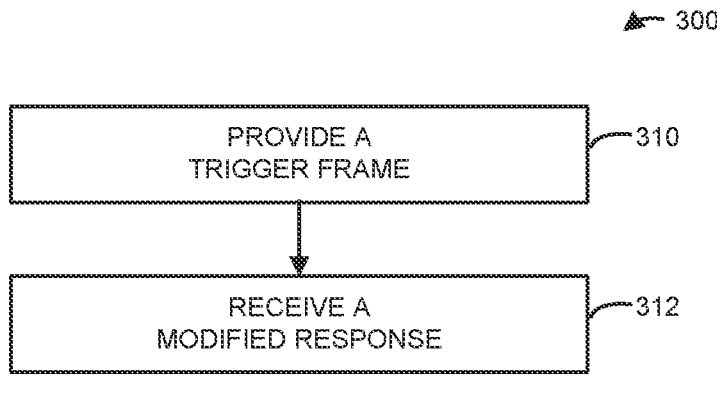
FIG. 3 is a flow diagram illustrating an example method for receiving a modified response frame using an electronic device of FIG. 1 or 2.

FIG. 3 presents a flow diagram illustrating an example method 300 for receiving a modified response frame. This method may be performed by an electronic device, such as access point 112 in FIG. 1. For example, method 300 may be implemented by an interface circuit in access point 112 in FIG. 1. Note that the communication between the electronic device and a second electronic device (such as electronic device 110-1 in FIG. 1) may be compatible with an IEEE 802.11 communication protocol.

During operation, the electronic device provides a trigger frame (operation 310) addressed to the second electronic device, where the trigger frame includes a trigger-frame variant that is compatible with an IEEE 802.11 standard. For example, the trigger frame may include a trigger type subfield value of 15 or a value between 0 and 7. Note that the IEEE 802.11 standard may include IEEE 802.11ax or a subsequent IEEE 802.11 standard.

Then, the electronic device receives a modified response frame (operation 312) associated with the second electronic device, where the modified response frame is different from a response frame associated with the trigger frame specified by the IEEE 802.11 standard.

In some embodiments, the electronic device optionally performs one or more additional operations. For example, the electronic device may provide another frame after the trigger frame is provided and before the modified response frame is received. This other frame may be different from the trigger frame, and the other frame may be addressed to the second electronic device or a third electronic device (which may be different from access point 112 and electronic device 110-1).

Moreover, the electronic device may provide a beacon advertising support for the modified response frame.

Furthermore, the electronic device may: receive an association request associated with the second electronic device, where the association request includes an indication of support by the second electronic device for the modified response frame and a request for parameters associated with the modified response frame; and provide an association response addressed to the second electronic device, where the association response includes an indication of support by the electronic device for the modified response frame and the parameters associated with the modified response frame. For example, the parameters may specify a minimum response time and a maximum response time for the modified response frame. Alternatively or additionally, the parameters may specify data to include in the modified response frame.

Furthermore, the modified response frame may include a modified payload that is different from a payload associated with the trigger frame specified by the IEEE 802.11 standard.

Additionally, the modified response frame may selectively include a variable amount of padding.

Figure 4:
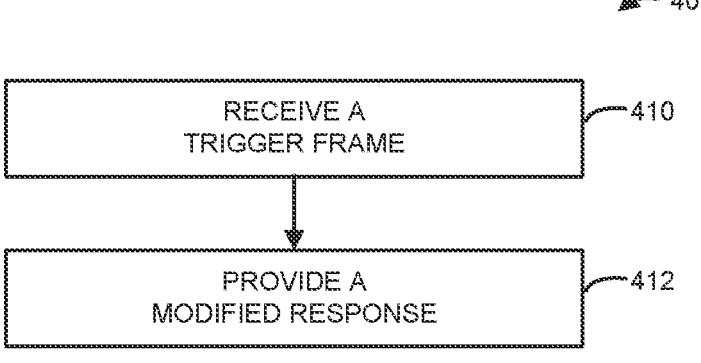
FIG. 4 is a flow diagram illustrating an example method for providing a modified response frame using an electronic device of FIG. 1 or 2.

FIG. 4 presents a flow diagram illustrating an example method 400 for providing a modified response frame. This method may be performed by a second electronic device, such as electronic device 110-1 in FIG. 1. For example, method 300 may be implemented by an interface circuit in electronic device 110-1 in FIG. 1. Note that the communication between the second electronic device and an electronic device (such as access point 112 in FIG. 1) may be compatible with an IEEE 802.11 communication protocol.

During operation, the second electronic device receives a trigger frame (operation 410) associated with the electronic device. This trigger frame includes a trigger-frame variant that is compatible with an IEEE 802.11 standard.

Then, the second electronic device provides a modified response frame (operation 412) addressed to the electronic device, where the modified response frame is different from a response frame associated with the trigger frame specified by the IEEE 802.11 standard.

In some embodiments, the second electronic device optionally performs one or more additional operations. For example, the second electronic device may receive another frame associated with the electronic device after the trigger frame is received and before the modified response frame is provided, where the other frame is different from the trigger frame.

Moreover, the second electronic device may receive a beacon associated with the electronic device advertising support for the modified response frame.

Additionally, the second electronic device may: provide an association request addressed to the electronic device, where the association request includes an indication of support by the second electronic device for the modified response frame and a request for parameters associated with the modified response frame; and receive an association response associated with the electronic device, where the association response includes an indication of support by the electronic device for the modified response frame and the parameters associated with the modified response frame.

In some embodiments of methods 300 (FIG. 3), and/or 400, there may be additional or fewer operations. Further, one or more different operations may be included. Moreover, the order of the operations may be changed, and/or two or more operations may be combined into a single operation or performed at least partially in parallel.

Figure 5:
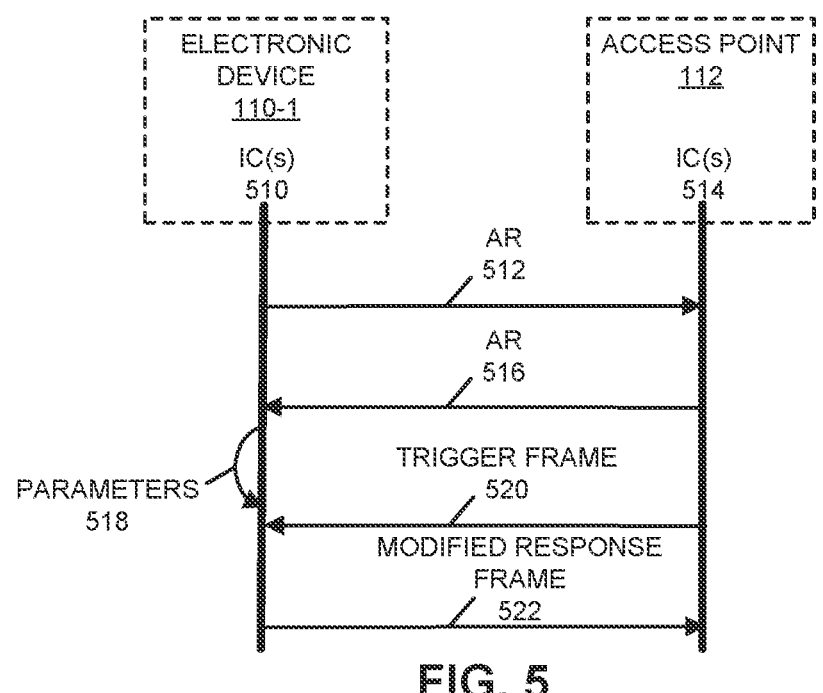
FIG. 5 is a drawing illustrating an example of communication between the electronic devices of FIG. 1 or 2.

The communication techniques are further illustrated in FIG. 5, which presents a flow diagram illustrating an example of communication between electronic device 110-1 and access point 112. During operation, one or more interface circuits (or interface circuitry) 510 in electronic device 110-1 may provide association request (AR) 512 to access point 112. This association request may indicate that electronic device 110-1 supports the use of modified response frame 522 and may request parameters 518 associated with modified response frame 522. After receiving association request 512, one or more interface circuits (or interface circuitry) 514 in access point 112 may provide an association response (AR) 516 to electronic device 110-1. This association response may indicate that access point 112 supports the use of modified response frame 522 and may include parameters 518, such as: a minimum response time and a maximum response time for the modified response frame 522; and/or data to include in modified response frame 522. Association response 516 may be received by the one or more interface circuits 510.

Subsequently, the one or more interface circuits 514 may provide a trigger frame 520 to electronic device 110-1. This trigger frame may include a trigger-frame variant that is compatible with an IEEE 802.11 standard, such as IEEE 802.11ax or a subsequent IEEE 802.11 standard. After receiving trigger frame 520, the one or more interface circuits 510 may provide modified response frame 522. Modified response frame 522 may be different from a response frame associated with trigger frame 520 specified by the IEEE 802.11 standard. For example, the modified response frame may include a modified payload that is different from a payload associated with trigger frame 520 specified by the IEEE 802.11 standard and/or a variable amount of padding. Moreover, the one or more interface circuits 514 may receive modified response frame 522 from electronic device 110-1.

While communication between the components in FIG. 5 is illustrated with unilateral or bilateral communication (e.g., lines having a single arrow or dual arrows), in general a given communication operation may be unilateral or bilateral.

Figure 6:
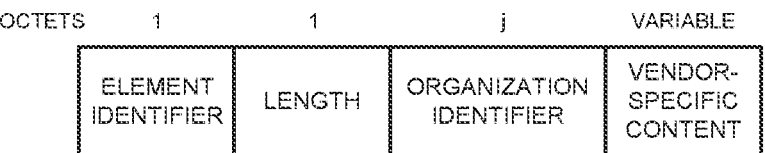
FIG. 6 is a drawing illustrating an example of a vendor-specific element format.
Figure 7:
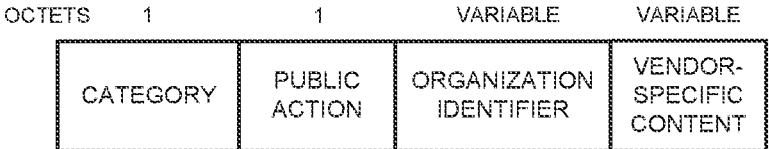
FIG. 7 is a drawing illustrating an example of a vendor-specific public action frame action field format.

We now further describe embodiments of the disclosed communication techniques. Many electronic devices communicate with each other using WLANs, such as those based on a communication protocol that is compatible with an IEEE 802.11 standard. As shown in FIGS. 6 and 7, which present a drawing illustrating an example of a vendor-specific element format and a drawing illustrating an example of a vendor-specific public action frame action field format, this communication may include a transmitter transmitting a vendor-specific element. Notably, the vendor-specific element may be added to many management frames (such as a beacon, an authentication request/response, an association request/response, a probe response, etc.). While the vendor-specific element has a predefined format, the vendor-specific information is defined by the vendor.

Moreover, Wi-Fi also defines a vendor-specific public management frame, which is often used. For example, neighborhood aware networking (NAN) uses vendor-specific management frames. The content and use of the vendor-specific management frame is not defined in IEEE 802.11 specifications. Furthermore, the vendor-specific public management frame may be a dual protected (or encrypted) management frame. Thus, while the vendor-specific public management frame may be transmitted as non-protected to clients or stations that do not support a protected management frame, stations that support a protected management frame may receive a protected vendor-specific management frame. Note that an organization identifier in the vendor-specific public management frame may include: a 24-bit organizationally unique identifier (OUI), a 24-bit company identifier or CID (3 bytes in length) or a 36-bit OUI (5 bytes in length). The OUI may be allocated to vendors by the IEEE. However, the vendor-specific management frame does not support soliciting of response from multiple recipients (such as stations) or triggering of responses.

Additionally, as shown in Table 1, which presents different trigger frames or trigger frame variants, existing IEEE 802.11 standards define multiple predefined types of trigger frames, or trigger frame variants, which are specified by a trigger type subfield value, where values between 0 and 7 have been assigned. For example, a trigger type subfield value of 0 specifies a basic trigger frame variant in which data and acknowledgment (ACK)/block acknowledgement (BA) frames are solicited. Notably, the basic trigger frame variant triggers an uplink (UL) data or management frame, which in turn solicits an acknowledgment or a block acknowledgment. Similarly, each of the trigger type subfield values specifies a predefined (and exact) response and payload from the recipient(s). Currently, trigger type subfield values of 8-14 and 15 are reserved, and a trigger type subfield value of 15 has been proposed in IEEE 8021me to specify a new vendor-specific trigger frame.

vendor-specific trigger frame may specify recourse unit (RU) allocations to one or more different recipients (as specified by association identifiers or AIDs), which as electronic device 110-1. In response, the one or more recipients may transmit frames using the specified or allocated resources units with content that is defined by the new

TABLE 1

| Trigger Type Subfield Value | Trigger Frame Variant | Solicited Frames | Comment |
|---|---|---|---|
| 0 | Basic | Data and Acknowledgment/Block Acknowledgment (ACK/BA) | Triggers uplink (UL) data or management frame that solicits ACK/BA |
| 1 | Beamforming Report Poll (BFRP) | High Efficiency (HE)Compressed Beam Forming Reports | Part of the beam forming signaling flow. |
| 2 | Multi-User Block Acknowledgment (MU-BAR) | Block Acknowledgment | MU-BAR frame defines BAR to multiple stations. BA is response to BAR. |
| 3 | Multi-User Request-to-Send (MU-RTS) | Clear-to-Send (CTS) | For channel reservation, Transmit Opportunity (TXOP) sharing, or Enhanced Multilink Single Radio Operation (EMLSR) initiation |
| 4 | Buffer Status Report Poll (BSRP) | QoS-Null and Buffer Status Report (BSR) | No ACK send to QoS Null. Used before EMLSR or Spatial Multiplexing Power Save (SMPS) |
| 5 | Group Cast with Replies (GCR) MU-BAR | BA | This is for GCR group frames |
| 6 | Bandwidth Query Report Poll (BQRP) | QoS-Null and Bandwidth Query Report (BQR) | Not tested. This will provide per 20 MHz clear channel assessment (CCA) information in response |
| 7 | Null Data Packet (NDP) Feedback Report Poll (NFRP) | NDP Response | Not tested. Only communicates 1 bit of information |
| 8-14, 15 | | Reserved | — |
| 15 | Vendor Specific | Defined by the vendor | Proposed in IEEE 802.11me |

Figure 8:
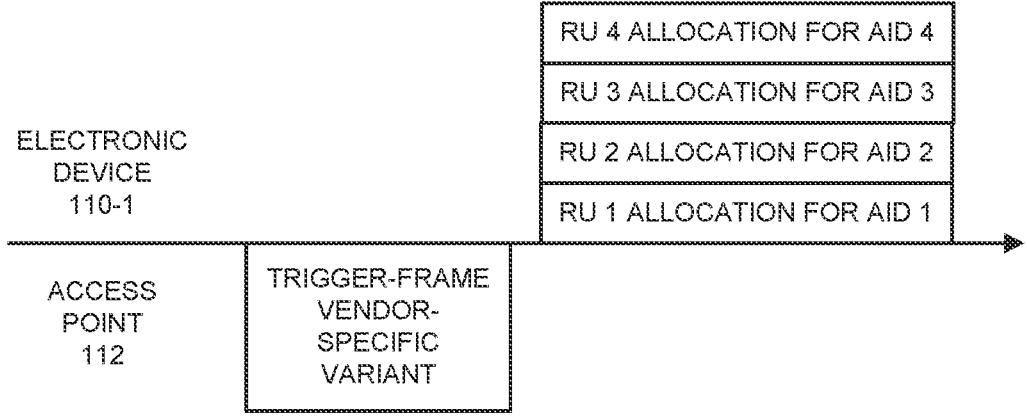
FIG. 8 is a drawing illustrating an example of communication between the electronic devices of FIG. 1 or 2.

FIGS. 8-12 and Tables 2 and 3 summarize an existing proposal for the new vendor-specific trigger frame in IEEE 802.11me. Notably, as shown in FIG. 8, which presents a drawing illustrating an example of communication between access point 112 and at least electronic device 110-1, access point 112 may transmit the new vendor-specific trigger frame that includes a trigger type subfield value of 15. This vendor-specific trigger frame. Note that the new vendor-specific trigger frame may be used for: access point-to-access point triggered transmission; and/or to improve quality-of-service or uplink triggered access by enabling more scheduling parameter collection for the recipient(s) (which may be useful for delay-sensitive scheduling).

TABLE 2

| Trigger Frame Portion | Common Information | Trigger Dependent Common Information | User List: User Information field | Trigger Dependent User Information Field (optional) |
|---|---|---|---|---|
| Explanation | Common parameters for all trigger frame variants | Signals vendor-specific trigger frame type and its common parameters for all trigger stations | RU allocation parameters. Common for all trigger frame variants | Vendor-specific trigger frame information for the triggered station |
| Length | 8 octets (fixed size) | Proposed: 2 + j + variable octets | 5 octets per RU allocation (fixed size) | Variable, added to the User Information Field |
| Proposed changes by vendor-specific trigger | Trigger Type field value (15) is allocated for | New standardized information field structure. | No changes by the vendor-specific Trigger frame | New standardized information structure. Values |

TABLE 2-continued

| Trigger Frame Portion | Common Information | Trigger Dependent Common Information | User List: User Information field | Trigger Dependent User Information Field (optional) |
|---|---|---|---|---|
| | vendor-specific trigger, otherwise no changes | | | and content defined by the vendor. |

TABLE 3

| Trigger Frame Portion | Modifications Proposed to the Field Structure |
|---|---|
| Common Information | No changes |
| Trigger Dependent Common Information | New field proposed |
| User List: | No changes |
| User Information field | |
| Trigger Dependent User Information field (optional) | Not defined in the submission |

As shown in Table 2, the structure of the new vendor-specific trigger frame in the existing proposal includes: common information, trigger-dependent common information, a user list (or user-information field), and an optional trigger-dependent user information field. The common information includes common parameters for all trigger-frame variants, and the proposed change is to use a trigger type subfield value of 15. Moreover, trigger-dependent common information signals a vendor-specific trigger frame type and its common parameters for all triggered recipient(s), which includes a new information field structure. The user list includes the resource-unit allocation parameters that are common to all trigger-frame variants, and there is no proposed changed. Furthermore, the trigger-dependent user information field includes vendor-specific trigger-frame information for the triggered recipient(s), which includes a new information structure with values and content defined by the vendor.

Figure 9:
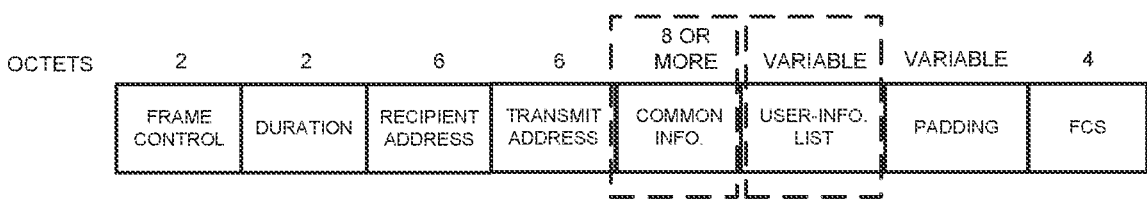
FIG. 9 is a drawing illustrating an example of a trigger-frame format.
Figure 10:
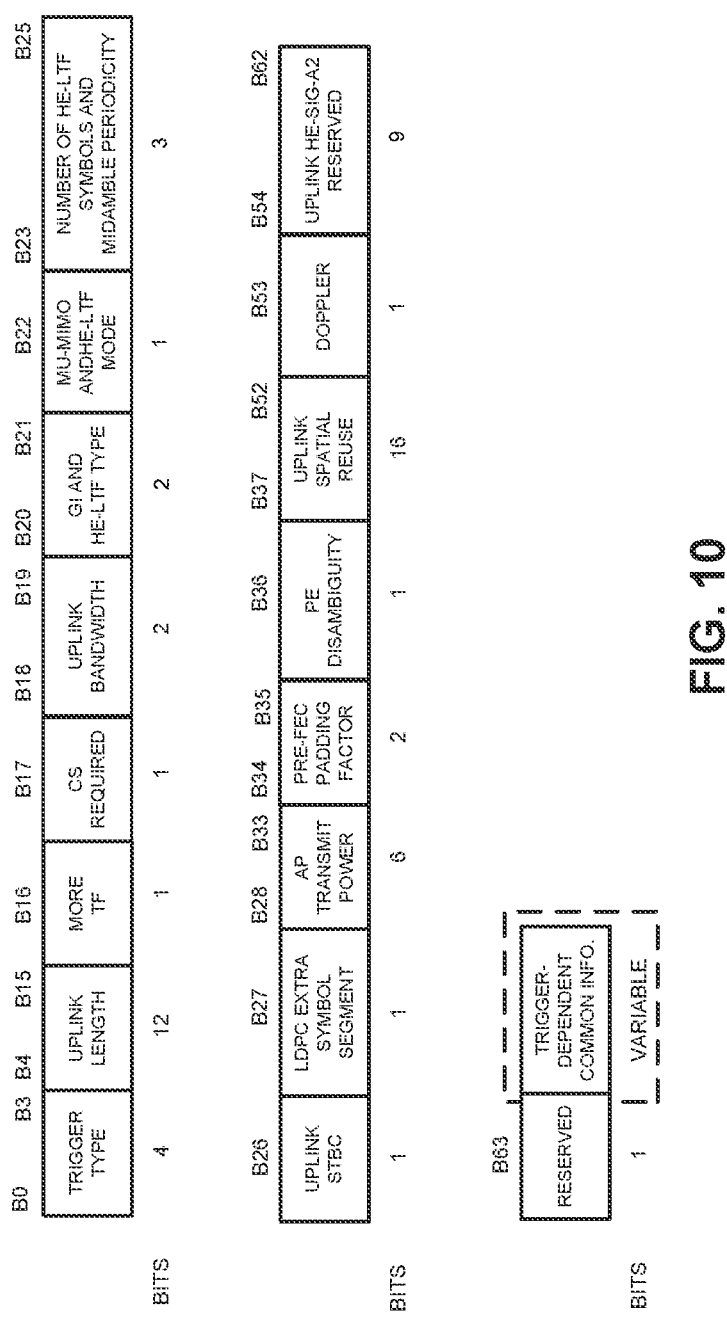
FIG. 10 is a drawing illustrating an example of a common information field format.
Figure 11:
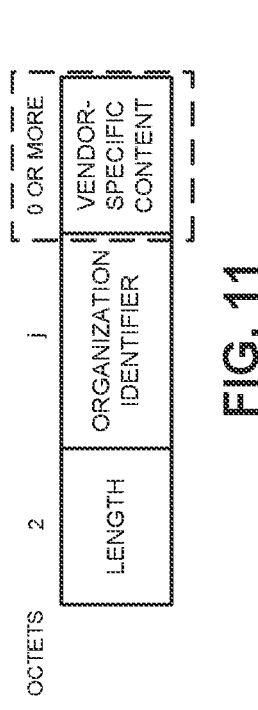
FIG. 11 is a drawing illustrating an example of a vendor-specific trigger frame format.
Figure 12:
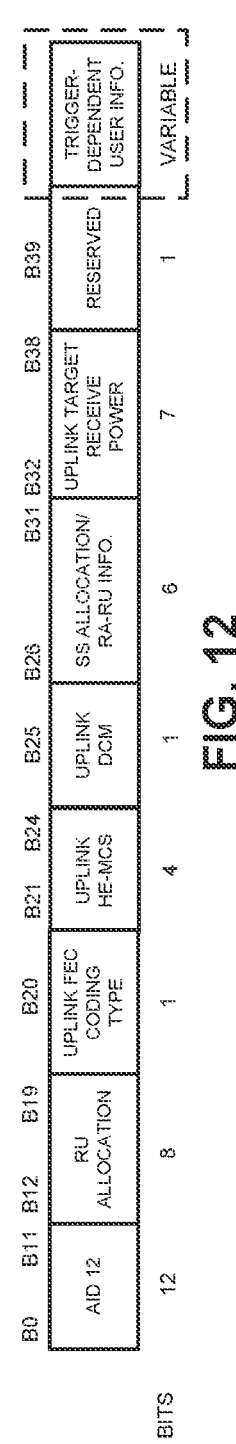
FIG. 12 is a drawing illustrating an example of a user information field format.

As shown in FIGS. 9 (which presents a drawing illustrating an example of a trigger-frame format) and 10 (which presents a drawing illustrating an example of a common information field format) and Table 3 (which presents modifications to a trigger-frame structure), note that the trigger-dependent common information is a new field that is not present in previously standardized vendor-specific trigger frames. The trigger-dependent common information includes: a length, an organization identifier and vendor-specific content. However, as shown in FIGS. 11 (which presents a drawing illustrating an example of a vendor-specific trigger frame format) and 12 (which presents a drawing illustrating an example of a user information field format), the length, organization identifier and the vendor-specific content in this existing proposal are not specified or predefined. Instead, they are all specified by the vendor. Moreover, the trigger-dependent user-information field is not specified or defined in the existing proposal. Note that trigger-dependent common information subfield may not be present in a vendor-specific trigger frame.

Vendor-specific trigger frames pose several challenges. Notably, in order to support the response timeline, vendor specific trigger frames typically require hardware support in the station. However, station hardware support is expensive to implement and it slows the adoption of vendor-specific solutions in the field. For example, typically only the newest electronic-device generations may implement the newest vendor-specific trigger frames. Moreover, the triggering efficiency may be similar to single-user (SU) signaling when only a few stations implement a particular vendor-specific trigger frame.

Note that access points may be able to implement vendor-specific trigger frames in software. This is because access-point requirements are typically related to handling the received information.

In general, the design targets for the vendor-specific triggering may include: enabling general a vendor-specific triggering framework that may be extended by software-defined new requests; and ensuring good triggering efficiency. For example, ensuring good triggering efficiency may include: responses are transmitted fast without long additional delays; efficient use of the allocated RUs; and low system overhead.

Figure 13:
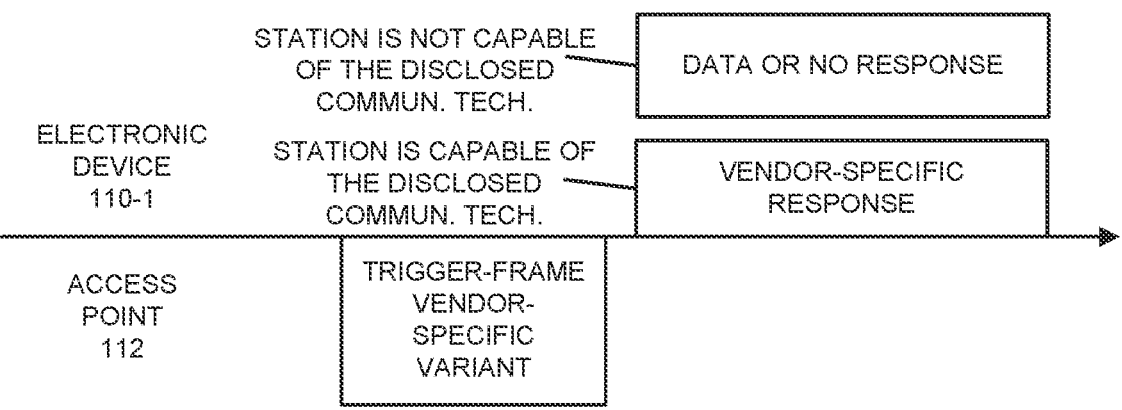
FIG. 13 is a drawing illustrating an example of communication between the electronic devices of FIG. 1 or 2.

The disclosed communication techniques may include at least three groups of embodiments to address the challenges posed by existing vendor-specific trigger frames. As shown in FIG. 13, which presents a drawing illustrating an example of communication between access point 112 and at least electronic device 110-1, in a first group of embodiments the existing proposal for the vendor-specific trigger frame discussed in FIGS. 8-12 and Tables 2 and 3 is modified to address some deficiencies in the existing proposal. Note that when a station is capable of responding to this second new vendor-specific trigger frame, the station may provide a vendor-specific response. Otherwise, the station may opportunistically provide a data frame or may not respond to the second new vendor-specific trigger frame. The first group of embodiments may provide a configurable vendor-specific trigger frame, may have a fast response time, and may allow trigger-response rules and/or rules on partial resources to be configurable, but may require hardware changes.

Figure 14:
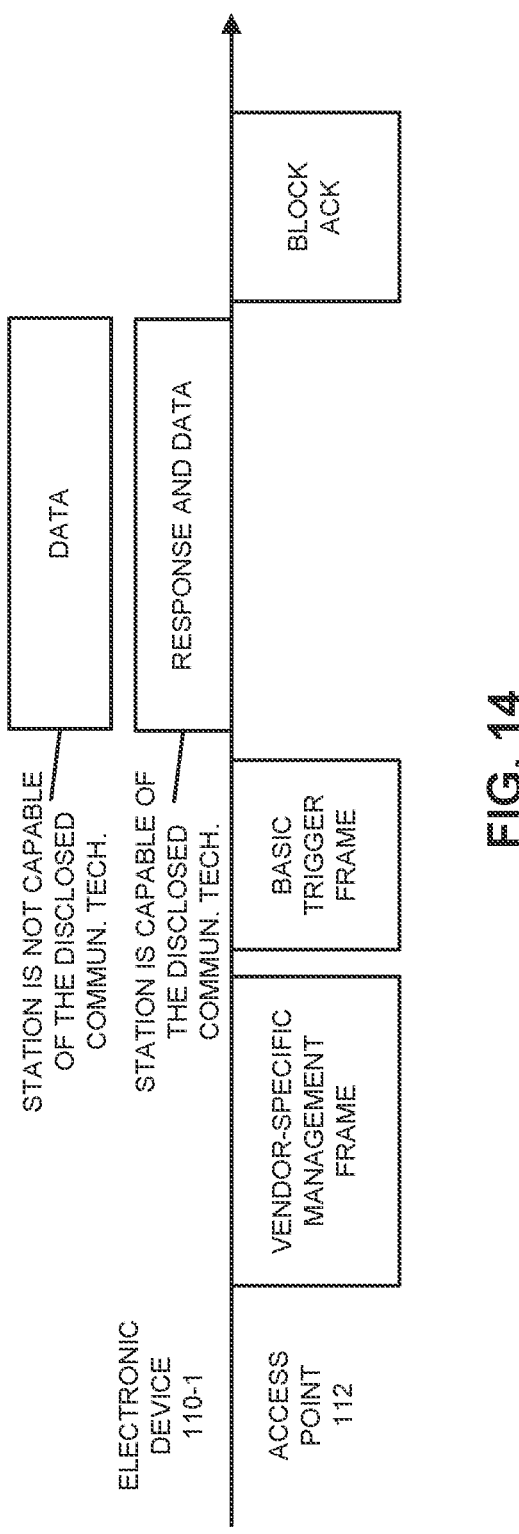
FIG. 14 is a drawing illustrating an example of communication between the electronic devices of FIG. 1 or 2.

As shown in FIG. 14, which presents a drawing illustrating an example of communication between access point 112 and at least electronic device 110-1, in the second group of embodiments a basic trigger frame is repurposed. Notably, a vendor-specific management/solicitation frame from a transmitter is used to redefine the response to a subsequent basic trigger frame from a recipient (such as a station). However, when the station does not support the repurposing, then the station may opportunistically provide a data frame. Note that the second group of embodiments may provide a configurable vendor-specific trigger frame, may have a slow response time (which may be close to an unsolicited response time), and may not allow trigger-response rules and/or rules on partial resources to be configurable, but may be implemented using hardware, software or firmware.

Figure 15:
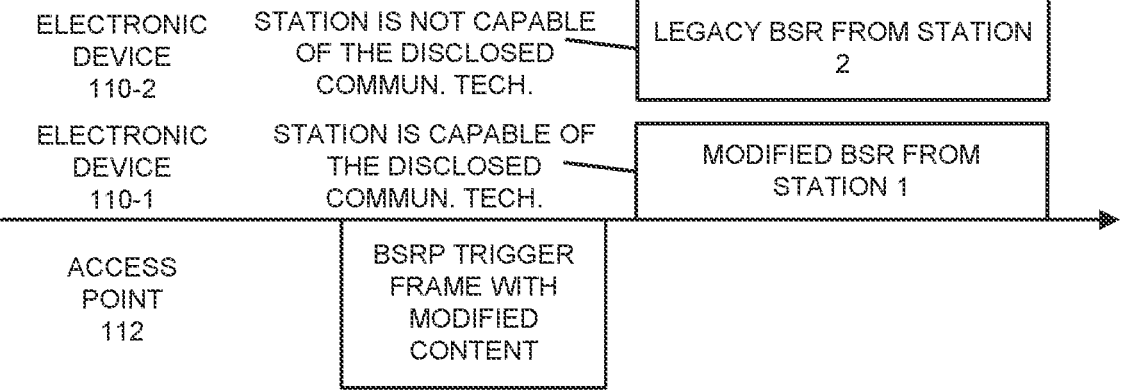
FIG. 15 is a drawing illustrating an example of communication between the electronic devices of FIG. 1 or 2.

Furthermore, as shown in FIG. 15, which presents a drawing illustrating an example of communication between access point 112 and at least electronic device 110-1 and electronic device 110-2, in the third group of embodiments an existing (standardized) vendor-specific trigger frame is reconfigured. For example, a buffer status report (BSRP) trigger frame may specify new content (in a payload) in a subsequent response from a station than the content that is standardized for a BSRP response. However, when the station does not support the reconfiguration, then the station may provide a legacy BSRP response (such as the existing standardized response). Note that the third group of embodiments may provide a configurable vendor-specific trigger frame, may have a fast response time, and may not allow trigger-response rules and/or rules on partial resources to be configurable, but may be implemented using hardware, software or firmware.

When now further describe the first group of embodiments. The first group of embodiments may address the problems with the existing proposal in FIGS. 8-12 and Tables 2 and 3. Notably, the challenge of needing a simple receiver of the vendor-specific trigger frames may be addressed by defining or specifying a second new vendor-specific trigger frame structure. For example, the trigger-specific common field and the user-specific field may be defined, so that they are easily received by all stations. Moreover, the delay requirements for a station to respond to an access-point request may be addressed by allowing a station to signal the time it needs to respond to the second new vendor-specific trigger frame. The transmitter (such as access point 112) may selectively add padding to the second new vendor-specific trigger frame to meet this duration. Alternatively, a station may be allowed to respond with a quality-of-service (QoS) null frame when the requested payload is not available at the response time. Furthermore, the triggered resource-unit efficiency may be addressed by defining or specifying the second new vendor-specific trigger frame structure that is understood by all stations. Alternatively, triggered stations may be allowed to respond with data or management frames even when they do not understand the second new vendor-specific trigger frame (as opposed to always ignoring the second new vendor-specific trigger frame in the existing proposal). Additionally, the system overhead may be addressed by using a minimum number of transmitted frames and short inter-frame spaces (SIFS). Note that the padding selectively added to the second new vendor-specific trigger frame may add overhead to all of the stations.

Figure 16:
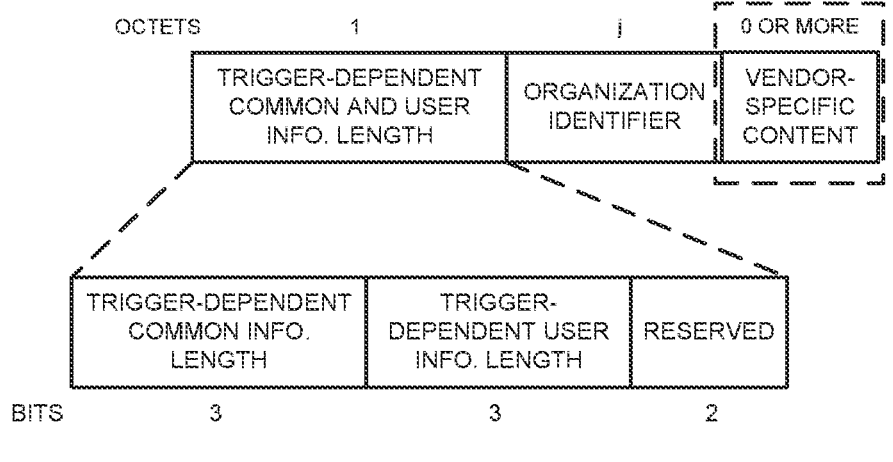
FIG. 16 is a drawing illustrating an example of a trigger-dependent common information field format.

As shown in FIG. 16 (which presents a drawing illustrating an example of a trigger-dependent common information field format) and Tables 4 (which presents modifications to a trigger-frame structure), 5 (which presents values of trigger-dependent common information) and 6 (which presents values of trigger-dependent user information), the trigger-dependent common information in the first group of embodiments may include a predefined trigger-dependent common and user-information length (e.g., 1 octet), an organization identifier (having a length or 3 or 5 octets) and vendor-specific content (having a length between 0 and 512 octets). Moreover, the trigger-dependent user information field in the user length may have a length that is specified in the trigger-dependent common information. Note that the trigger-dependent common information length may be specified by three bits and the trigger-dependent user information length may be specified by three bits. For example, trigger-dependent common information length values between 0 and 7 may specify a field length between 0 and 512 octets, and trigger-dependent user information length values between 0 and 7 may specify a field length between 0 and 512 octets. These relationships may need to be implemented in hardware in a station.

TABLE 4

| Trigger Frame Portion | Modifications Proposed to the Field Structure |
|---|---|
| Common Information | No changes |
| Trigger Dependent Common Information | New field as proposed |
| User List: User Information field | No changes |
| Trigger Dependent User Information field (optional) | The length is specified in Trigger Dependent Common Information |

TABLE 5

| Value of Trigger Dependent Common Information | Size of the Field |
|---|---|
| 0 | 0 |
| 1 | 8 |
| 2 | 16 |
| 3 | 32 |
| 4 | 64 |
| 5 | 128 |
| 6 | 256 |
| 7 | 512 |

TABLE 6

| Value of Trigger Dependent User Information | Size of the Field |
|---|---|
| 0 | 0 |
| 1 | 8 |
| 2 | 16 |
| 3 | 32 |
| 4 | 64 |
| 5 | 128 |
| 6 | 256 |
| 7 | 512 |

Figure 17:
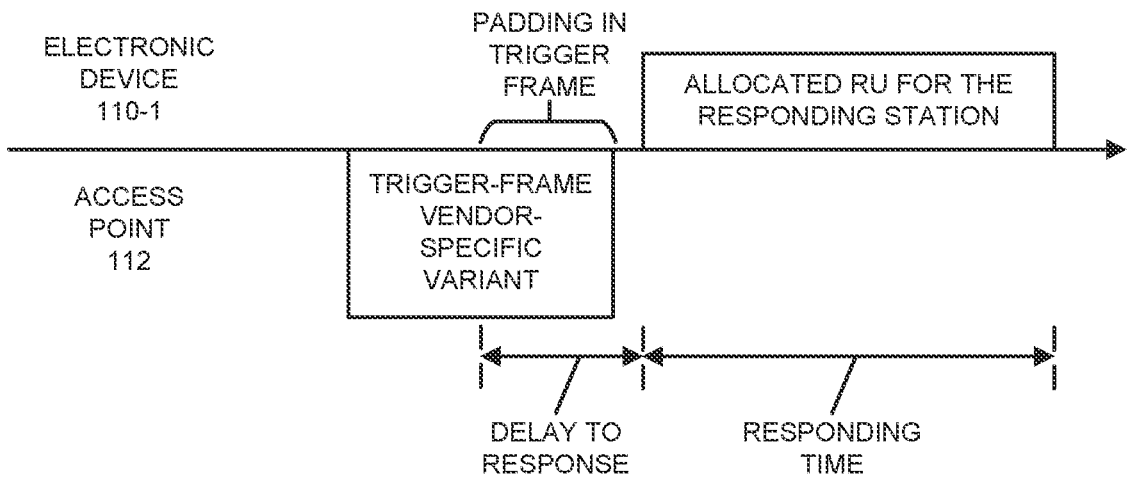
FIG. 17 is a drawing illustrating an example of communication between the electronic devices of FIG. 1 or 2.

Additionally, the existing proposal did not define how rapidly a station needs to respond to the new vendor-specific trigger frame. As shown in FIG. 17, which presents a drawing illustrating an example of communication between access point 112 and at least electronic device 110-1, in the first group of embodiments this problem may be addressed by the station and the transmitter (such as access point 112) configuring to each vendor-specific trigger frame whether: the vendor-specific trigger frame contains the whole transmission delay; or the vendor-specific trigger frame and the start of the response transmission may be used as the response delay.

For example, when the vendor-specific trigger frame contains the whole transmission delay, the start of the allocated RU may be timed to start at least the response delay (such as less than 40-50 ms) after the resource-unit allocation information carried in a beacon frame is transmitted. Note that the vendor-specific trigger frame may include resource-unit allocations for other stations, fake resource-unit allocations or other selective padding. Typically, this response delay type may be used when the response is carried in the A-Control frame in a media access control (MAC) header. This approach may be used when the RU is received and parsed rapidly, so that the beginning of the response frame in the allocated resource-unit transmission time for the responding station can be provided within the allocated response delay. In some embodiments, the allocated response time may be long and the responder may be allowed to send other frames between the vendor-specific trigger frame and the associated response.

Figure 18:
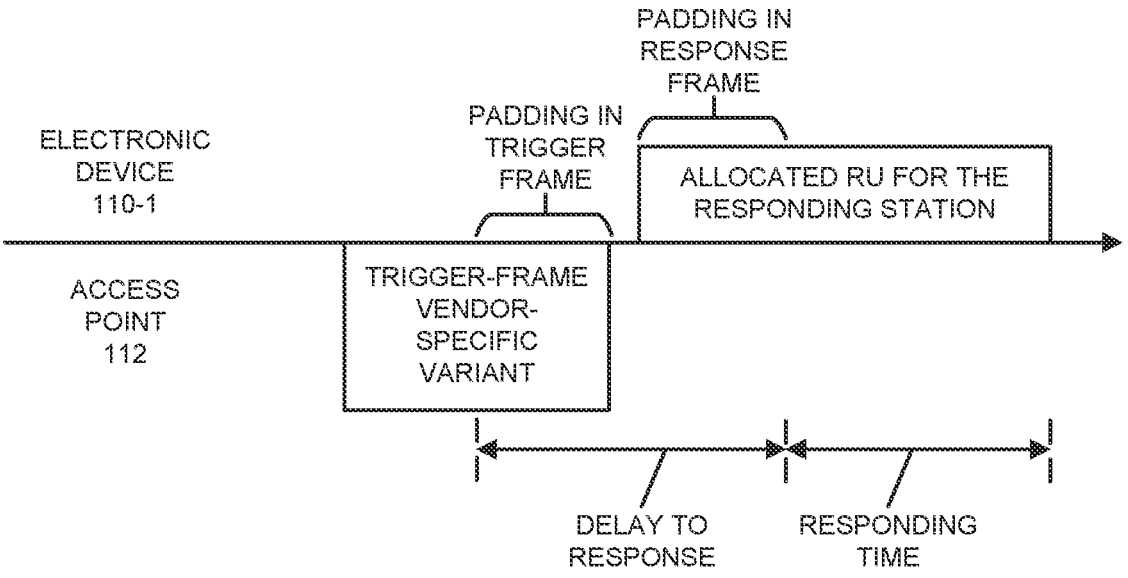
FIG. 18 is a drawing illustrating an example of communication between the electronic devices of FIG. 1 or 2.

Alternatively, as shown in FIG. 18, which presents a drawing illustrating an example of communication between access point 112 and at least electronic device 110-1, when the response time is longer (such as less than a few milliseconds), the response time following receiving and parsing a RU in a vendor-specific trigger frame and the start of the requested response may occur in the middle of allocated RU transmission time for the responding station. In this case, the trigger frame and the start of the response transmission may be used to provide the response delay. For example, the triggered station may send other data in the allocated RU before it sends the response frame. In some embodiments, the triggered station may send empty A-MPDU subframes when the response frame is not ready. Notably, the responding station may transmit an aggregated-media access control (MAC) protocol data unit or MPDU (A-MPDU) and may include in the A-MPDU data frames from zero or more traffic identifiers (TIDs), and the requested response may be carried in a management frame. The station may first transmit one or more other frames. Moreover, the vendor-specific trigger frame may include a dialog token in the trigger-dependent user-information field. This dialog token may differentiate the response from other frames transmitted during the allocated RU, such as when the responder may have created the same frame type that is requested by the vendor-specific trigger from. Note that in order to use this delay type, the transmitter and responder may need to be multi-TID capable or may be capable of aggregating data and management frames in the same physical layer convergence protocol (PLCP) protocol data unit (PPDU).

Thus, in some embodiments there may be selective padding in the second new vendor-specific trigger frame (e.g., before the A-control field in the MAC header and payload) and/or the response. This padding may include resource-unit allocations to AIDs that do not exist in the network, or empty resource-unit allocations with a value of '2045' in an AID field. Alternatively or additionally the second new vendor-specific trigger frame may include a padding field that may extend the trigger-frame duration by 8 or 16 µs.

Figure 19:
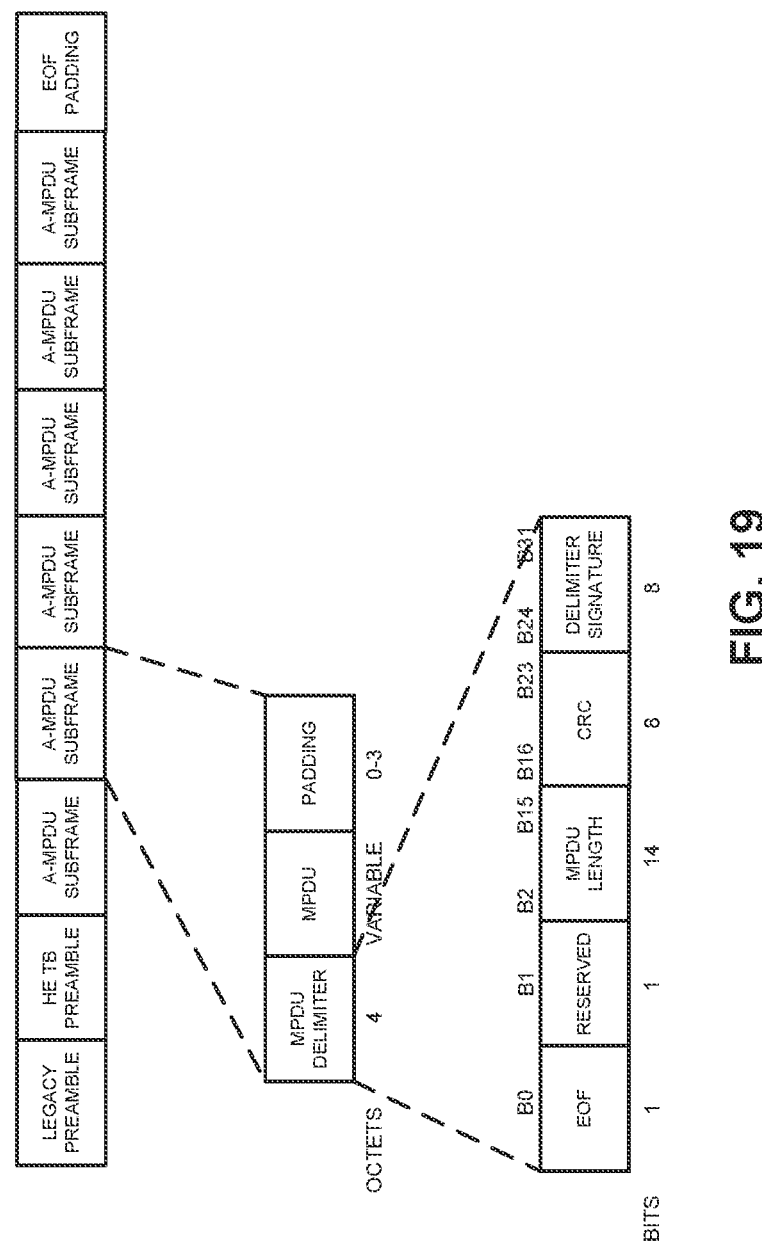
FIG. 19 is a drawing illustrating an example of content in an allocated resource unit (RU).

FIG. 19 presents a drawing illustrating an example of content in an allocated RU. Notably, FIG. 19 shows the use padding using A-MPDU subframes following a high-efficiency (HE) trigger-based (TB) preamble in an allocated RU. When padding is allowed in the response frame, then the response frame may include one or more A-MPDU subframes. Moreover, when the responding station is able to transmit other data when it prepares the triggered information to be transmitted, the station may transmit this information. For example, the responding station may send data from multiple TIDs. However, when the triggered station does not have data to send, the station may transmit one or more empty A-MPDU subframes before the response frame is available. An empty A-MPDU subframe may have a value of '0' in the MPDU length field of the MPDU delimiter. This may indicate that the A-MPDU subframe does not include an MPDU.

In the second group of embodiments a vendor-specific management/solicitation frame may be used to repurpose a basic trigger frame or a BSRP trigger frame (e.g., by changing the predefined payload that is supported in hardware). In some embodiments, the transmitter may optionally transmit one or more other frames (such as a downlink packet) between the vendor-specific management/solicitation frame and the triggered response frame.

The second group of embodiments may address some of the challenges with existing vendor-specific trigger frames. Notably, the challenge of needing a simple receiver of the vendor-specific trigger frames may be addressed by not defining or specifying a new trigger frame. Moreover, the delay requirements for a station to respond to an access-point request may be addressed by having the station being able to receive the soliciting management frame rapidly and the transmit the requested payload in resource-unit allocated by the basic trigger frame. Note that having rapid management-frame reception may be more-strict requirement than the was previously needed by the station. Furthermore, the triggered resource-unit efficiency may be addressed because all electronic devices may respond to a basic-variant trigger frame. Consequently no resources may be wasted. However, depending on the station capabilities, the allocated RU for response transmission may need to be short. Additionally, regarding the system overhead, adding single-user/multi-user (MU) PPDU and SIFS may increase the overhead. However, a transmitter (such as access point 112) may communicate with another station when the response from a triggered station is slow, which reduced the overhead.

Figure 20:
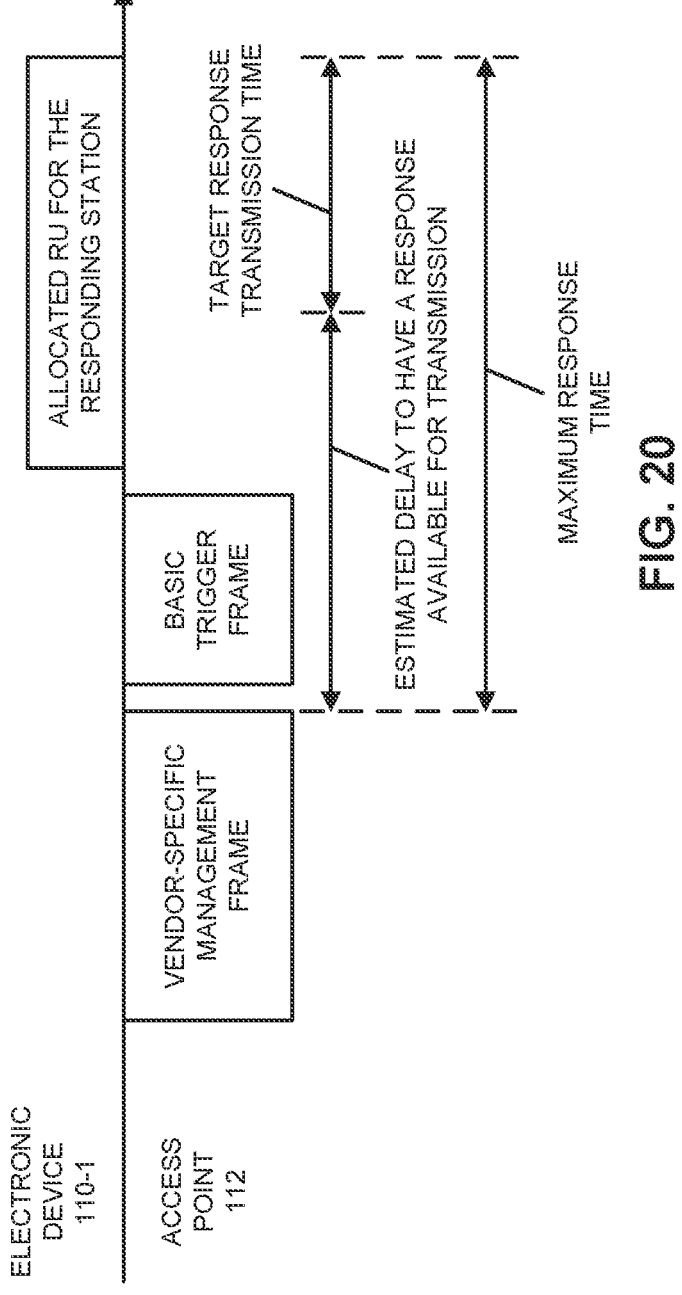
FIG. 20 is a drawing illustrating an example of communication between the electronic devices of FIG. 1 or 2.

Moreover, as shown in FIG. 20, which presents a drawing illustrating an example of communication between access point 112 and at least electronic device 110-1, the response time to the vendor-specific management frame may be defined from the end of the vendor-specific management frame and may occur during an allocated resource-unit transmission time of the responding station. However, when a maximum response time (from the end of the vendor-specific management frame to the end of the allocated resource-unit transmission time) is exceeded, non-transmitted response(s) may be discarded.

Note that the response transmission minimum delay may be defined by the station. Notably, this may be the minimum duration that the station needs to prepare the response. Alternatively, the response transmission maximum delay (which is the maximum transmission time for the solicited response) may be specified. As noted previously, the response may be discarded after this time. In some embodiments, the response transmission minimum delay and/or the response transmission maximum delay may depend on: a response frame type, solicited information and response specific value. In general, a given station may have a different response transmission minimum delay value from other stations. The transmitter (such as access point 112) may specific different MAC delay values.

Figure 21:
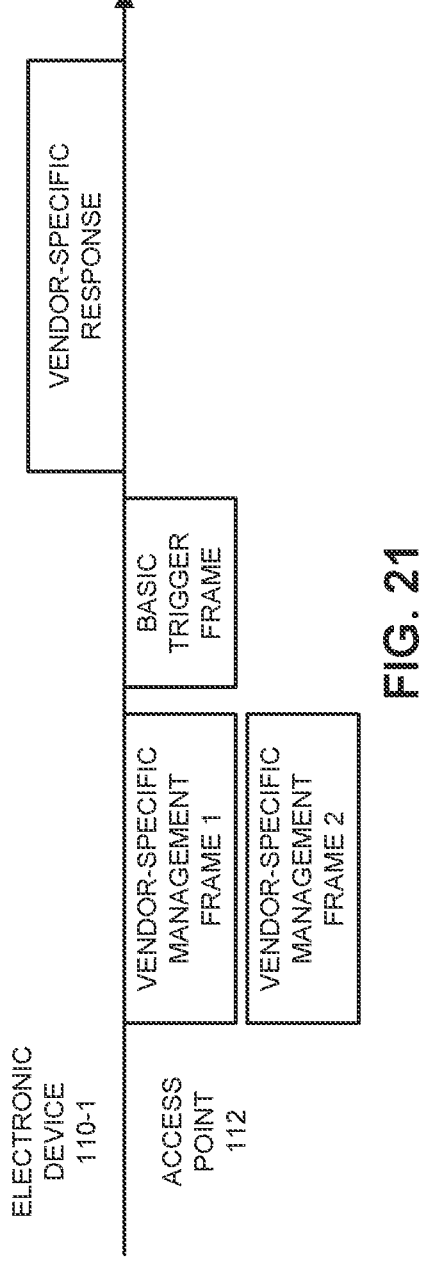
FIG. 21 is a drawing illustrating an example of communication between the electronic devices of FIG. 1 or 2.

As shown in FIG. 21, which presents a drawing illustrating an example of communication between access point 112 and at least electronic device 110-1, the vendor-specific management frame may include or specify: a solicited information type, solicited information, a unique identifier of the response, and/or a response transmission mechanism (such as triggered, unsolicited, etc.). Notably, the solicited information type may specify the solicited frame type or the field where the solicited information is added to frames (such as in an A-Control field or in a management frame). Moreover, the solicited information may specify the information or the data included in the response. Furthermore, the unique identifier of the response may include a dialog token (e.g., in the trigger-dependent common information) that is used in the response frame to identify the response. Furthermore, the response transmission mechanism may specify the allowed response mechanism for the station. For example, the station may: only respond to a trigger frame; or transmit the requested frame using any mechanism. Note that aforementioned information may be included in each request. This information may be signaled in the vendor-specific management frame or may be configured during the setup of vendor-specific management frames.

Furthermore, Table 7 presents PPDU alternatives for the vendor-specific management frame. Notably, the vendor-specific trigger frame may have multiple alternative PPDU formats and approaches for soliciting responses from multiple stations. Note that an acknowledgement may be desired to ensure correct reception of the frame. Moreover, a MU PPDU may send or may include multiple vendor-specific management frame.

TABLE 7

| PPDU Type for Soliciting Vendor-Specific Frame | Addressing | Acknowl-edged? | Note |
|---|---|---|---|
| SU PPDU | Individual | Yes | Request to a single station |
| MU PPDU | Group | No | Association identifier (AID) fields may be added to the request to solicit response from multiple stations |

For example, a SU PPDU vendor-specific management frame may address an individual (but not a group), may be acknowledged, or may request a response from a single station. However, when AID fields are added to the request, responses may be solicited from multiple stations.

Alternatively, a MU PPDU may address an individual (but not a group), may be acknowledged, or may request a response from multiple stations. Note that multiple AID values may be pointing to a group-addressed RU.

Thus, in some embodiments, one vendor-specific management frame may convey different trigger-frame requirements for different clients.

Additionally, in the third group of embodiments a type of trigger-frame response may be reconfigured using the type of the trigger frame. The third group of embodiments may address some of the challenges in existing vendor-specific trigger frames. Notably, the challenge of needing a simple receiver of the vendor-specific trigger frames may be addressed by requiring that the responding station is able to configure a new payload creation as a response to the trigger frame (because the legacy trigger frame variants may not include new fields). Moreover, the delay requirements for a station to respond to an access-point request may be addressed by having the new payload created within the trigger-frame response time. The new payload creation may be more time consuming than a legacy response. However, there are no new trigger-frame requirements (instead, as described further below with reference to FIG. 26, the modified response frame may have been previously config-ured, such as during association). Furthermore, the triggered resource-unit efficiency may be addressed because the trig-ger frame may be fully compatible. Consequently, a legacy station may respond with a legacy response. Additionally, regarding the system overhead, there may be a minimum number of transmitted frames and SIFS, but the optional padding added to the trigger frame may add overhead to all of the stations. Note that any bit (see, e.g., FIG. 16 and Tables 4-6) of an existing trigger frame may be configured to request a special information type and/or reconfigure the response duration. For example, the requested reconfigura-tion may be included in the A-control field.

Table 8 presents modifications to a trigger-frame struc-ture, and Table 9 presents an example of reconfigured trigger-frame bits. Notably, the user-information field values may be receiver-specific. When these fields are reconfig-ured, the transmitter (such as access point 112) may request device-specific information. In some embodiments, the val-ues of one or more fields that are not commonly needed may be reconfigured. This may be a common setting for all trigger frames. Alternatively, some trigger-frame variants, such as a BSRP trigger frame, do not have trigger-frame specific values.

TABLE 8

| Trigger Frame Portion | Modifications Proposed to the Field Structure |
|---|---|
| Common Information | No changes |
| Trigger Dependent Common Information | |
| User List: | Configure fields to new values |
| User Information field | |
| Trigger Dependent User Information field (optional) | Not present |

TABLE 9

| Example of the Field with Reconfigured Value | How the Field Is Reconfigured |
|---|---|
| UL DCM (1 bit) | The field is configured to value 0 (UL DCM is not allowed) |
| UL Target Receive Power (UTRP) | The least significant bit (LSB) is set to value 0 in UTRP signaling |

For example, the uplink dual carrier modulation (DCM) bit in the user list or user-information field may be recon-figured. Notably, this field may be configured to a value of '0' (so uplink DCM is not allowed). Alternatively or addi-tionally, the uplink target receive power (UTRP) bit may be reconfigured. Note that the least significant bit may be set to a value of '0' in UTRP signaling. Using the uplink DCM and the UTRP bits, the requested payload of the trigger-frame variant may be reconfigured. As shown in Table 10, which presents an example of solicited information for different values of the DCM and the UTRP bits. Note that a value of '0' may indicate soliciting of a legacy payload (which is compatible with the payload specified in an IEEE 802.11 standard for this trigger-frame variant), which values of '1', '2' or '3' may specify enhanced payloads 1, 2 or 3.

TABLE 10

| Value | Example of Solicited Information |
|---|---|
| 0 | Legacy payload |
| 1 | Enhanced payload 1 |
| 2 | Enhanced payload 2 |
| 3 | Enhanced payload 3 |

Moreover, vendor-specific information may be conveyed in a trigger frame. Notably, a trigger frame may carry additional signaling in user-information fields. For example, an AID value may identify the information type. Some AID values may signal the receiver of the information, such as all station receive the trigger frame, triggered stations, or a station with a particular AID value. Note that the common information may be included in the first information element of the trigger. This may ensure the longest reaction time for the reconfigured information.

For example, an IEEE 802.11 standard may specify the AID value, which is known by all vendor-specific trigger-ing-capable stations. Notably, the first RU may have an AID of '2043' that specifies common information for all trigger stations. However, in the second set of embodiments, a user-specific AID of '2044' may be transmitted as the next RU after the RU for the station allocated with station AID of '2043'. The AID of '2044' may allocate vendor-specific information that is transmitted only to the receiver of the previous RU (or user-specific information to a single triggered station).

Moreover, a vendor may define an AID value that is known only by electronic devices that know this vendor's settings. Thus, the value may be implementation specific. For example, the AID value may be between 1-2007, and one station may be allocated multiple AID values. This approach may specify common information for all triggered stations or user-specific information to a single triggered station.

Furthermore, as shown in Table 11, which presents modifications to a trigger-frame structure, the user-information list (such as the optional trigger-dependent user-information field) in the trigger-frame variant may be reconfigured to create a vendor-specific trigger frame. Notably, the user-information field and the trigger-dependent user-information field may define the length of the user-information field, and special AID values may allocate or specific this length.

TABLE 11

| Trigger Frame Portion | Modifications Proposed to the Field Structure |
|---|---|
| Common Information Trigger Dependent Common Information | No changes |
| User List: User Information field Trigger Dependent User Information field (optional) | The User Information and Trigger Dependent field define the length of User Information field. Special AID values allocate this length of information. |

For example, as shown in Table 12, which presents an example of user information in a reconfigured legacy trigger variant, the user-information field may reconfigure a legacy (IEEE 802.11-standard compliant) trigger-frame variant to allocate RUs for station 1 and station 2. Notably, an AID value of '2043' may specify common information for all stations, an AID value of station 1 may specify user information and trigger-specific fields, an AID value of '2044' may specify vendor-specific information for station 1, an AID value of station 2 may specify user information and trigger-specific fields, and/or an AID value of '2044' may specify vendor-specific information for station 2.

TABLE 12

| AID | User Information |
|---|---|
| 2043 | Common Information for all |
| AID of station 1 | User Information and trigger-specific fields |
| 2044 | Vendor-specific information for station 1 |
| AID of station 2 | User Information and trigger-specific fields |
| 2044 | Vendor-specific information for station 2 |

Figure 22:
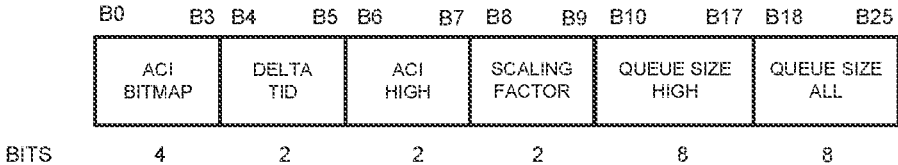
FIG. 22 is a drawing illustrating an example of a control information subfield format.

We now describe examples of the communication techniques. FIG. 22, which presents a drawing illustrating an example of a control information subfield format, shows an example of an enhanced buffer status report/QOS report frame. Notably, a transmitter (such as access point 112) may transmit a BSRP trigger frame to solicit a buffer status report in an A-Control field in a QoS null frame. Note that the recipient station may only provide this frame as a response. Instead of a predefined buffer status report A-control field, the station may be configured to transmit a vendor-specific frame or a vendor-specific A-Control element. This frame/A-control element may include: how long (such as a time) a low latency frame has been buffered in the transmitter, or an estimation of the time when the next uplink frame is available for transmission; and/or amount of buffered data, TID(s) and/or delays of uplink frames in transmission.

Figure 23:
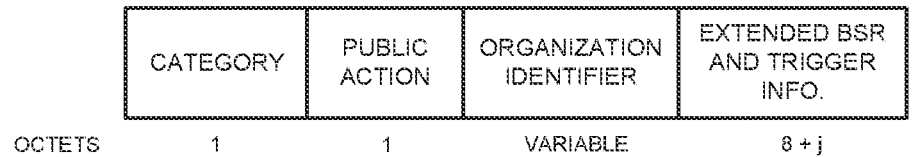
FIG. 23 is a drawing illustrating an example of a management frame.

For example, as shown in FIG. 23, which presents a drawing illustrating an example of a management frame, a vendor-specific management frame may provide more information on buffered uplink frames and triggering, such as: a category, a public action, an organization identifier, and an extended buffer status report A-Control field content and triggering information. Moreover, as shown in FIG. 24, which presents a drawing illustrating an example of an extended buffer status report and triggering information element, an extended buffer status report and triggering-information element may include: an element, a length, an organization identifier, buffer status report A-Control field content, an uplink frame arrival (a signed integer of 100 μs when the uplink packet has arrived, where negative values are estimations for the next uplink frame arrival time), and trigger information (which may request more-frequent or less-frequent triggering).

Figure 25:
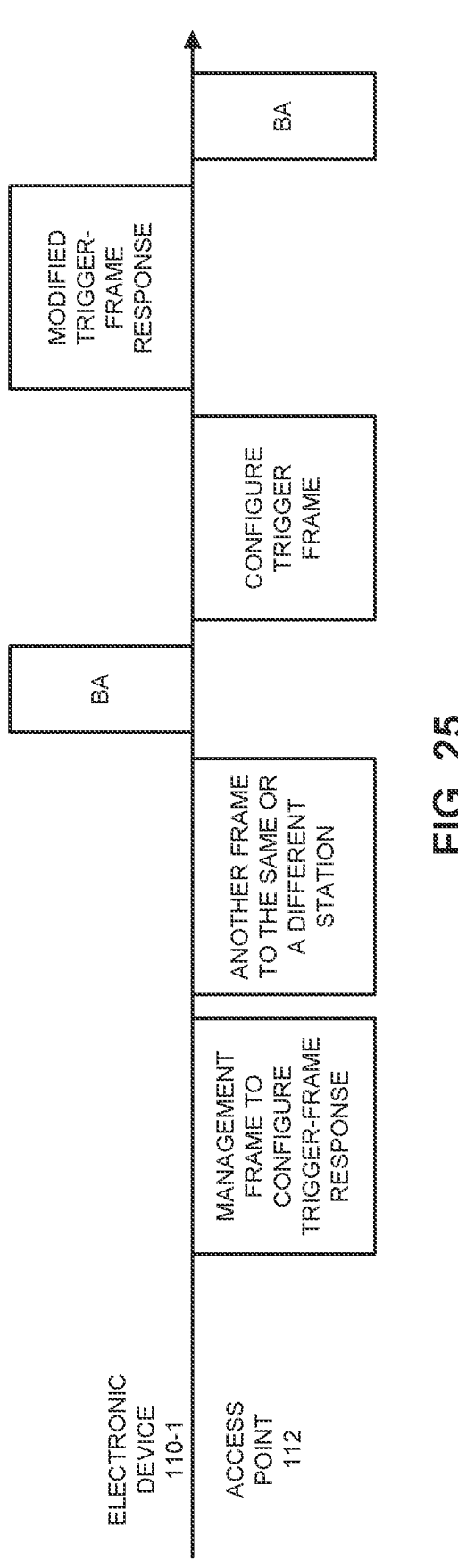
FIG. 25 is a drawing illustrating an example of communication between the electronic devices of FIG. 1 or 2.

FIG. 25 presents a drawing illustrating an example of communication between access point 112 and at least electronic device 110-1. Notably, in some embodiments, the management frame may need some time to configure the modified response to the trigger frame. Thus, in some embodiments, the communication techniques may allow the time requirements of trigger-frame configuration to be relaxed.

For example, a station (such as electronic device 110-1) may have some configured time that it needs after receiving the management frame to configure the correct response type for the trigger frame. In some embodiments, a BSR type may be changed and the modified BSR may include a packet delay or may use the remaining transmission time. However, the configuration to be able to send in the remainder of the transmission time as a response to a trigger frame may take time. In this case, there may be another (intervening) transmission to the same electronic device or third electronic device in order to efficiently use resources.

In other embodiments, the management frame may configure one time response that is solicited by the trigger frame. The creation of the response may need some calculation time. For example, an access point may request a station (as part of a bigger group of stations) to measure how long (a time) the channel is busy. This measurement may take time and the measurement responses may involve responses from multiple stations that are solicited by a vendor-specific trigger frame. Note that the use of concurrent or simultaneous measurements and responses may help the access point obtain an improved understanding of the business of the channel.

Figure 26:
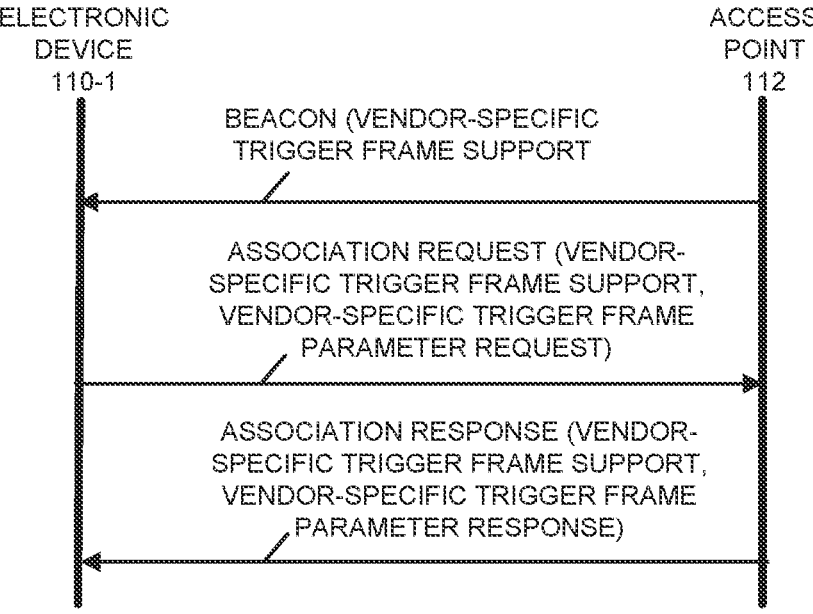
FIG. 26 is a drawing illustrating an example of communication between the electronic devices of FIG. 1 or 2.

Moreover, FIG. 26 shows embodiments of ways to configure use of a vendor-specific trigger frame. Notably, as shown in FIG. 26, which presents a drawing illustrating an example of communication between access point and at least electronic device 110-1, a station and a transmitter (such as access point 112) may need to configure the vendor-specific trigger frames to be available for the link or association. The station may respond only on vendor-specific trigger frames that are configured to be available. Furthermore, the access point and the station may explicitly signal support for the vendor-specific trigger frame variants and setup trigger-frame specific delays for the response. The supported vendor-specific trigger frames and their settings may need to be agreed separately. Additionally, the configuration signaling may be part of the association or there may be separate setup signaling. Thus, a beacon may indicate vendor-specific trigger-frame support, an association request may indicate vendor-specific trigger-frame support and a vendor-specific trigger-frame parameters request), and/or an association response may indicate vendor-specific trigger-frame support and a vendor-specific trigger-frame parameters response.

For example, as shown in FIG. 27, which presents a drawing illustrating an example of a vendor-specific trigger frame, a first bit may indicate support of vendor-specific trigger frame, a second bit may indicate support of an unknown vendor-specific trigger, a third bit may indicate support of a vendor-specific management/solicitation frame, and/or a fourth bit may indicate support of a configurable response to a trigger frame. Note that a given bit having a value of '0' may indicate that a feature is not supported, while the given bit having a value of '1' may indicate that the feature is supported.

In summary, the first set of embodiments may address problems in the existing proposal for the new vendor-specific trigger frame. Moreover, the second set of embodiments repurposed a trigger-frame response using a vendor-specific management frame. Furthermore, the third set of embodiments reconfigured a trigger-frame response.

Note that the formats of packets or frames communicated during the communication techniques may include more or fewer bits, subfields or fields. Alternatively or additionally, the position of information in these packets or frames may be changed. Thus, the order of the subfields or fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots. In some embodiments, the communication techniques may use OFDMA.

Moreover, while the preceding embodiments illustrated the use of Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 60 GHz frequency band, a Citizens Broadband Radio Service (CBRS) frequency band, a band of frequencies used by LTE or another data communication protocol, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 28 presents a block diagram of an electronic device 2800 (which may be a cellular telephone, a smartwatch, an access point, a wireless speaker, an IoT device, another electronic device, etc.) in accordance with some embodiments. This electronic device includes processing subsystem 2810, memory subsystem 2812 and networking subsystem 2814. Processing subsystem 2810 includes one or more devices configured to perform computational operations. For example, processing subsystem 2810 can include one or more microprocessors, application-specific integrated circuits (ASICs), microcontrollers, graphics processing units (GPUs), programmable-logic devices, and/or one or more digital signal processors (DSPs).

Memory subsystem 2812 includes one or more devices for storing data and/or instructions for processing subsystem 2810, and/or networking subsystem 2814. For example, memory subsystem 2812 can include dynamic random access memory (DRAM), static random access memory (SRAM), a read-only memory (ROM), flash memory, and/or other types of memory. In some embodiments, instructions for processing subsystem 2810 in memory subsystem 2812 include: program instructions or sets of instructions (such as program instructions 2822 or operating system 2824), which may be executed by processing subsystem 2810. For example, a ROM can store programs, utilities or processes to be executed in a non-volatile manner, and DRAM can provide volatile data storage, and may store instructions related to the operation of electronic device 2800. Note that the one or more computer programs may constitute a computer-program mechanism, a computer-readable storage medium or software. Moreover, instructions in the various modules in memory subsystem 2812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2810. In some embodiments, the one or more computer programs are distributed over a network-coupled computer system so that the one or more computer programs are stored and executed in a distributed manner.

In addition, memory subsystem 2812 can include mechanisms for controlling access to the memory. In some embodiments, memory subsystem 2812 includes a memory hierarchy that comprises one or more caches coupled to a memory in electronic device 2800. In some of these embodiments, one or more of the caches is located in processing subsystem 2810.

In some embodiments, memory subsystem 2812 is coupled to one or more high-capacity mass-storage devices (not shown). For example, memory subsystem 2812 can be coupled to a magnetic or optical drive, a solid-state drive, or another type of mass-storage device. In these embodiments, memory subsystem 2812 can be used by electronic device 2800 as fast-access storage for often-used data, while the mass-storage device is used to store less frequently used data.

Networking subsystem 2814 includes one or more devices configured to couple to and communicate on a wired and/or wireless network (i.e., to perform network operations), such as: control logic 2816, one or more interface circuits (or interface circuitry) 2818 and a set of antennas 2820 (or antenna elements) in an adaptive array that can be selectively turned on and/or off by control logic 2816 to create a variety of optional antenna patterns or 'beam patterns.' Alternatively, instead of the set of antennas, in some embodiments electronic device 2800 includes one or more nodes 2808, e.g., a pad or a connector, which can be coupled to the set of antennas 2820. Thus, electronic device 2800 may or may not include the set of antennas 2820. For example, networking subsystem 2814 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

In some embodiments, networking subsystem 2814 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 2814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 2800 may use the mechanisms in networking subsystem 2814 for performing simple wireless communication between the electronic devices, e.g., transmitting advertising or frame frames and/or scanning for advertising frames transmitted by other electronic devices.

Within electronic device 2800, processing subsystem 2810, memory subsystem 2812 and networking subsystem 2814 are coupled together using bus 2828 that facilitates data transfer between these components. Bus 2828 may include an electrical, optical, and/or electro-optical connection that the subsystems can use to communicate commands and data among one another. Although only one bus 2828 is shown for clarity, different embodiments can include a different number or configuration of electrical, optical, and/or electro-optical connections among the subsystems.

In some embodiments, electronic device 2800 includes a display subsystem 2826 for displaying information on a display, which may include a display driver and the display, such as a liquid-crystal display, a multi-touch touchscreen, etc. Display subsystem 2826 may be controlled by processing subsystem 2810 to display information to a user (e.g., information relating to incoming, outgoing, or an active communication session).

Moreover, electronic device 2800 can also include a user-input subsystem 2830 that allows a user of the electronic device 2800 to interact with electronic device 2800. For example, user-input subsystem 2830 can take a variety of forms, such as: a button, keypad, dial, touch screen, audio input interface, visual/image capture input interface, input in the form of sensor data, etc.

Electronic device 2800 can be (or can be included in) any electronic device with at least one network interface. For example, electronic device 2800 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 2800, in alternative embodiments, different components and/or subsystems may be present in electronic device 2800. For example, electronic device 2800 may include one or more additional processing subsystems, memory subsystems, networking subsystems, and/or display subsystems. Additionally, one or more of the subsystems may not be present in electronic device 2800. Moreover, in some embodiments, electronic device 2800 may include one or more additional subsystems that are not shown in FIG. 28. In some embodiments, electronic device may include an analysis subsystem that performs at least some of the operations in the communication techniques. Also, although separate subsystems are shown in FIG. 28, in some embodiments some or all of a given subsystem or component can be integrated into one or more of the other subsystems or component(s) in electronic device 2800. For example, in some embodiments program instructions 2822 are included in operating system 2824 and/or control logic 2816 is included in the one or more interface circuits 2818.

Moreover, the circuits and components in electronic device 2800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 2814. This integrated circuit may include hardware and/or software mechanisms that are used for transmitting wireless signals from electronic device 2800 and receiving signals at electronic device 2800 from other electronic devices. Aside from the mechanisms herein described, radios are generally known in the art and hence are not described in detail. In general, networking subsystem 2814 and/or the integrated circuit can include any number of radios. Note that the radios in multiple-radio embodiments function in a similar way to the described single-radio embodiments.

In some embodiments, networking subsystem 2814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 2822, operating system 2824 (such as a driver for an interface circuit in networking subsystem 2814) or in firmware in an interface circuit networking subsystem 2814. Alternatively or additionally, at least some of the operations in the communication techniques may be implemented in a physical layer, such as hardware in an interface circuit or interface circuitry in networking subsystem 2814. In some embodiments, the communication techniques are implemented, at least in part, in a MAC layer and/or in a physical layer in an interface circuit in networking subsystem 2814.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of the communication techniques electromagnetic signals in one or more different frequency bands are used. For example, these signals may be communicated in one or more bands of frequencies, including: a microwave frequency band, a radar frequency band, 900

MHz, 2.4 GHz, 5 GHz, 6 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:

an antenna node communicatively coupled to an antenna; and an interface circuit, communicatively coupled to the antenna node, configured to communicate with a second electronic device, wherein the interface circuit is configured to:

receive an association request associated with the second electronic device, wherein the association request comprises an indication of support by the second electronic device for a modified response frame and a request for a parameter associated with the modified response frame;

provide an association response addressed to the second electronic device, wherein the association response comprises an indication of support by the electronic device for the modified response frame and the parameter associated with the modified response frame, wherein the parameter indicates: a minimum response time and a maximum response time for the modified response frame;

provide a trigger frame addressed to the second electronic device, wherein the trigger frame comprises a trigger-frame variant that is compatible with a standard, and wherein the standard comprises Institute of Electrical and Electronics Engineers (IEEE) 802.11ax; and receive the modified response frame associated with the second electronic device, wherein at least one modification to the modified response frame that is different from a response frame specified by the standard.

2. The electronic device of claim 1, wherein the interface circuit is configured to provide an additional frame after the trigger frame is provided and before the modified response frame is received;

wherein the additional frame is different from both a management frame and the trigger frame, and the additional frame is addressed to the second electronic device or a third electronic device.

3. The electronic device of claim 1, wherein the trigger frame comprises a trigger type subfield value of 15 or a value between 0 and 7.

4. The electronic device of claim 1, wherein the electronic device comprises an access point.

5. The electronic device of claim 1, wherein the interface circuit is configured to provide a beacon advertising support for the modified response frame.

6. The electronic device of claim 1, wherein the modified response frame comprises a modified payload that is different from a payload specified by the standard for the trigger frame.

7. The electronic device of claim 1, wherein the modified response frame selectively comprises a variable amount of padding.

8. A method for receiving a modified response frame, comprising:

an electronic device:

receiving an association request associated with the second electronic device, wherein the association request comprises an indication of support by the second electronic device for a modified response frame and a request for a parameter associated with the modified response frame;

providing an association response addressed to the second electronic device, wherein the association response comprises an indication of support by the electronic device for the modified response frame and the parameter associated with the modified response frame, wherein the parameter indicates: a minimum response time and a maximum response time for the modified response frame;

providing a trigger frame addressed to a second electronic device, wherein the trigger frame comprises a trigger-frame variant that is compatible with a standard, and wherein the standard comprises Institute of Electrical and Electronics Engineers (IEEE) 802.11ax; and receiving the modified response frame associated with the second electronic device, wherein the modified response frame comprises a modification that is different from a response frame specified by the standard.

9. The method of claim 8, wherein the method comprises providing an additional frame after the trigger frame is provided and before the modified response frame is received;

wherein the additional frame is different from both a management frame and the trigger frame, and the additional frame is addressed to the second electronic device or a third electronic device.

10. The method of claim 8, wherein the modified response frame comprises a modified payload that is different from a payload specified by the standard for the trigger frame.

11. The method of claim 8, wherein the modified response frame selectively comprises a variable amount of padding.

12. An electronic device, comprising:

an antenna node communicatively coupled to an antenna; and an interface circuit, communicatively coupled to the antenna node, configured to communicate with a second electronic device, wherein the interface circuit is configured to:

receive an association request associated with the second electronic device, wherein the association request comprises an indication of support by the second electronic device for a modified response frame and a request for a parameter associated with the modified response frame;

provide an association response addressed to the second electronic device, wherein the association response comprises an indication of support by the electronic device for the modified response frame and the parameter associated with the modified response frame, wherein the parameter indicates: a minimum response time and a maximum response time for the modified response frame;

receive a trigger frame associated with the second electronic device, wherein the trigger frame comprises a trigger-frame variant that is compatible with a standard, and wherein the standard comprises Institute of Electrical and Electronics Engineers (IEEE 802.11ax; and provide a modified response frame addressed to the second electronic device, wherein the modified response frame comprises a modification that is different from a response frame specified by the standard.

13. The electronic device of claim 12, wherein the interface circuit is configured to receive an additional frame associated with the second electronic device after the trigger frame is received and before the modified response frame is provided;

wherein the additional frame is different from the trigger frame.

14. The electronic device of claim 12, wherein the trigger frame comprises a trigger type subfield value of 15 or a value between 0 and 7.

15. The electronic device of claim 12, wherein the electronic device comprises a station associated with the second electronic device and the second electronic device comprises an access point.

16. The electronic device of claim 12, wherein the interface circuit is configured to receive a beacon associated with the second electronic device advertising support for the modified response frame.

17. The electronic device of claim 12, wherein the modified response frame comprises a modified payload that is different from a payload specified by the standard for the trigger frame.

18. The electronic device of claim 12, wherein the modified response frame selectively comprises a variable amount of padding.

* * * * *